United States Patent
Sethi et al.

(10) Patent No.: US 12,220,745 B2
(45) Date of Patent: Feb. 11, 2025

(54) METHOD FOR PRODUCING ZERO-VALENT METALS IN FILTERING MEDIA

(71) Applicant: POLITECNICO DI TORINO, Turin (IT)

(72) Inventors: Rajandrea Sethi, Turin (IT); Carlo Bianco, Turin (IT); Andrea Gallo, Turin (IT); Tiziana Anna Elisabetta Tosco, Turin (IT)

(73) Assignee: POLITECNICO DI TORINO, Turin (IT)

( * ) Notice: Subject to any disclaimer, the term of this patent is extended or adjusted under 35 U.S.C. 154(b) by 601 days.

(21) Appl. No.: 17/280,206

(22) PCT Filed: Oct. 11, 2019

(86) PCT No.: PCT/IB2019/058700
§ 371 (c)(1),
(2) Date: Mar. 26, 2021

(87) PCT Pub. No.: WO2020/084378
PCT Pub. Date: Apr. 30, 2020

(65) Prior Publication Data
US 2022/0033283 A1  Feb. 3, 2022

(30) Foreign Application Priority Data

Oct. 26, 2018 (IT) .................. 102018000009831

(51) Int. Cl.
| | |
|---|---|
| B22F 9/24 | (2006.01) |
| B01D 15/20 | (2006.01) |
| B22F 1/054 | (2022.01) |
| B22F 7/08 | (2006.01) |
| C02F 1/28 | (2023.01) |
| C02F 1/48 | (2023.01) |
| C02F 1/70 | (2023.01) |
| C02F 101/30 | (2006.01) |

(52) U.S. Cl.
CPC .............. *B22F 9/24* (2013.01); *B01D 15/206* (2013.01); *B22F 1/056* (2022.01); *B22F 7/08* (2013.01); *C02F 1/288* (2013.01); *C02F 1/48* (2013.01); *C02F 1/705* (2013.01); *B22F 2304/05* (2013.01); *C01P 2002/85* (2013.01); *C02F 1/281* (2013.01); *C02F 2101/308* (2013.01); *C02F 2305/08* (2013.01)

(58) Field of Classification Search
CPC .............. C02F 1/288; B09C 1/08; B22F 9/24
See application file for complete search history.

(56) References Cited

U.S. PATENT DOCUMENTS

| | | | |
|---|---|---|---|
| 6,592,294 B1 | 7/2003 | Moore | |
| 7,341,664 B2 | 3/2008 | Lee et al. | |
| 7,635,236 B2 | 12/2009 | Zhao et al. | |
| 8,283,034 B2 | 10/2012 | Feitz et al. | |
| 9,983,327 B2 | 5/2018 | Johnston et al. | |
| 2016/0052800 A1* | 2/2016 | Dong | ................... B01J 20/3078 427/244 |
| 2020/0384530 A1 | 12/2020 | Sethi et al. | |

FOREIGN PATENT DOCUMENTS

| | | |
|---|---|---|
| CN | 104722777 A | 6/2015 |
| WO | 2009140694 A2 | 11/2009 |

OTHER PUBLICATIONS

He, J., Kunitake, T. and Nakao, A., 2003. Facile in situ synthesis of noble metal nanoparticles in porous cellulose fibers. Chemistry of Materials, 15(23), pp. 4401-4406. (Year: 2003).*
He, Facile In Situ Synthesis of Noble Metal Nanoparticles in Porous Cellulose Fibers, Chem. Mater., 2003, 15, p. 4401-4406 (Year: 2003).*
He, Facile Fabrication of Ag—Pd Bimetallic Nanoparticles in Ultrathin TiO2-Gel Films: Nanoparticle Morphology and Catalytic Activity, J. Am. Chem. Soc., 2003, 125, 36, p. 11034-11040 (Year: 2003).*
He, Stabilization of Fe—Pd Nanoparticles with Sodium Carboxymethyl Cellulose foe Enhanced Transport and Dechlorination of Trichloroethylene in soil and Groundwater, Ind. Eng. Chem. Res., 2007, 46, 1, p. 29-34 (Year: 2007).*
Junhui He, et al., Facile In Situ Synthesis of Noble Metal Nanoparticles in Porous Cellulose Fibers, Chem Mater, 2003, pp. 4401-4406, 15.
Theresa A. Dankovich, et al., Bactericidal Paper Impregnated with Silver Nanoparticles for Point-of-Use Water Treatment, Environmental Science & Technology, 2011, pp. 1992-1998, 45.
Khara D. Grieger, et al., Environmental benefits and risks of zero-valent iron nanoparticles (nZVI) for in situ remediation: Risk mitigation or trade-off?, Journal of Contaminant Hydrology, 2010, pp. 165-183, 118.
Alberto Tiraferri, et al., Reduced aggregation and sedimentation of zero-valent iron nanoparticles in the presence of guar gum, Journal of Colloid and Interface Science, 2008, pp. 71-79, 324.

(Continued)

*Primary Examiner* — Tabatha L Penny
(74) *Attorney, Agent, or Firm* — Bayramoglu Law Offices LLC

(57) ABSTRACT

A method for producing microparticles and/or nanoparticles based on zero-valent metals directly inside a filtering media and/or for creating covering layers based on the zero-valent metals for covering. The filleting media includes the steps of introducing at least one solution containing metal salts in the filtering medium, introducing at least one solution containing inorganic reducing agents into the filtering medium. The steps of introducing the at least one solution containing metal salts and the at least one solution containing inorganic reducing agents inside the filtering medium is carried out in a way separated in time and/or in space to realize, in the filtering medium, a mixture of metal ions with the inorganic reducing agents as well as a chemical reduction of the zero-valent metals to form the microparticles and/or the nanoparticles and/or coverings based on the zero-valent metals inside of the filtering medium.

38 Claims, 10 Drawing Sheets

(56) References Cited

OTHER PUBLICATIONS

Navid Saleh, et al., Ionic Strength and Composition Affect the Mobility of Surface-Modified Fe0 Nanoparticles in Water-Saturated Sand cols. Environ. Sci. Technol., 2008, pp. 3349-3355, 42.

D. W. S. Faulkner, et al., Electrokinetic generation of reactive iron-rich barriers in wet sediments: implications for contaminated land management, Mineralogical Magazine, 2005, pp. 749-757, vol. 69 No.5.

Carlo Bianco, et al., Controlled Deposition of Particles in Porous Media for Effective Aquifer Nanoremediation, Scientific Reports, 2017, pp. 1-10, 7.

* cited by examiner

Before      After

Before    After

METHOD FOR PRODUCING ZERO-VALENT METALS IN FILTERING MEDIA

CROSS REFERENCE TO THE RELATED APPLICATIONS

This application is the national stage entry of International Application No. PCT/IB2019/058700, filed on Oct. 11, 2019, which is based upon and claims priority to Italian Patent Application No. 102018000009831, filed on Oct. 26, 2018, the entire contents of which are incorporated herein by reference.

TECHNICAL FIELD

The present invention aims at providing a method for producing microparticles and nanoparticles of zero-valent metal inside filtering media and/or for creating covering layers based on zero-valent metals for covering, even partially, the surface of the filtering media themselves or portions thereof.

The method can be applied to filtering media of any kind, comprising for example, but not only, porous media, granular media, fractured media, porous or filtering systems, packings and packed systems, systems of pores and/or channels and/or chambers interconnected with each other, sponges, networks and reticular systems, elements with honeycomb structure, filters, fabrics, foams and expanded materials, biological filters, systems allowing filtration and/or infiltration and/or permeation and/or transport of fluids inside them.

The object of the method is to generate microparticles and/or nanoparticles and/or coverings based on zero-valent metals directly inside a filtering medium in order to modify the mechanical, chemical (for example the ability to react with other substances), chemical-physical (for example the ability to adsorb other substances), hydrodynamics (for example the porosity and/or permeability thereof), geochemical and/or superficial (for example the superficial charge thereof) properties. The possible applications of the method are therefore multiple, and comprise, among others, the conditioning and/or the functionalization of filtering media, the covering (or the coating) of the surface of the grains or of the fractures of a filtering medium with particles and/or metal layers, the creation of reactive and/or catalytic filtering beds, the remediation of contaminated sites, the treatment and the disinfection of waste waters, the creation of single or multiple reactive zones inside the filtering medium, the creation and/or the functionalization of filtering supports for the treatment and the disinfection of air flows, the removal and/or immobilization and/or degradation and/or transformation of substances and/or contaminants inside the filtering medium.

BACKGROUND

The main application field of the invention is the remediation of contaminated aquifers. The pollution of the underground water resources, and of the aquifers in particular, is a major problem today. A large number of polluting substances, both of anthropic and natural origin, is continuously introduced into all the environmental compartments, often finding in the soils and in the underground waters a preferential way of migration and/or accumulation. The presence of these substances in significant concentrations and for prolonged periods of time can entail risks for human health, either directly through exposure by contact, inhalation or ingestion, or indirectly due to their introduction into the food chains, as well as for the environment and for the aquatic and terrestrial ecosystems.

Preferably, the remediation techniques operate the removal or immobilization of the contaminant directly inside the environmental matrix in which they are located, limiting as far as possible the removal of the polluted matrix itself (for example underground water, soil, etcetera). This allows to significantly reduce the timing, the costs and the impacts of the remediation on the long period, besides allowing a rapid reallocation of the intended use of the contaminated site. One of the most promising remediation techniques is the "nanoremediation", which consists in the injection into the subsoil of reactive microparticles and/or nanoparticles in order to induce the degradation, the transformation and/or the immobilization of the pollutants directly inside the aquifer and/or the soil. The "nanoremediation" has gradually established itself in the panorama of the non-invasive treatments as a competitive and avant-garde technology, aiming at replacing traditional techniques, often less effective or convenient.

The microparticles and nanoparticles used for remediation may have different composition, depending on the contaminant and on the site to be treated; some nanomaterials proposed for the remediation of contaminated aquifers comprise metal iron nanoparticles, iron oxides or sulfides, bimetal materials, composite materials based on a zero-valent metal and on a non-metal support (activated carbon, zeolites), emulsified nanoparticles; the nanomaterials of greatest interest in the remediation of the contaminated sites are those based on zero-valent iron that have shown in recent years excellent potential in the treatment of numerous recalcitrant contaminants, both organic (chlorinated hydrocarbons) and inorganic (heavy metals) thanks to their high specific surface, determined by the micrometric or nanometric dimensions, which greatly increases their reactivity. Zero-valent iron micro and nanoparticles for example have long been used for the degradation of recalcitrant contaminants, such as for example chlorinated hydrocarbons. The use of zero-valent iron micro and nanoparticles allows the colloidal suspension to be injected directly into the contaminating source, thus managing to directly attack the pollutant in the segregated phase. The current methods for producing microscopic and nanoscopic particles of zero-valent metals, and in particular microscopic and nanoscopic particles of zero-valent iron, are thermal reduction processes, for the mass production of reagent material, or chemical reduction processes of metal salts by using organic and/or inorganic agents. With regard to the production of zero-valent microparticles and nanoparticles through the chemical reduction, one of the most widely used reducing agents is sodium borohydride. Although this compound produces good quality particles, its application produces by-products known as toxic and/or carcinogenic compounds (for example borates). Therefore, recently the attention has turned towards the use of reducing agents with a low environmental impact for producing microparticles and nanoparticles based on zero-valent metals. For example, U.S. Pat. No. 8,283,034 has proposed the use of dithionite salts that, in a basic environment and in a deoxygenated atmosphere, are able to operate the reduction of metal ions to the zero-valent state.

One of the most critical aspects in the application of the "nanoremediation" concerns the introduction and the conveyance of the reactive partides into the contaminated aquifer. The particles of zero-valent metals used for the remediation of contaminated underground waters are typically dispersed in the form of aqueous suspensions and introduced in the subsoil by means of different dosing techniques depending on the specific applicative case.

The colloidal suspensions of microparticles and nanoparticles of zero-valent metals must be stable, or metastable, in order to allow their effective conveyance in the subsoil by means of the specific adopted technique. In most cases, the simple colloidal dispersion in water (or liquid) does not guarantee stability. For example, zero-valent iron microparticles dispersed in water rapidly sediment due to their density. Also, zero-valent iron nanoparticles rapidly aggregate, and consequently sediment, due to particle-particle magnetic attractions. This behavior makes the microparticles and nanoparticles unsuitable for direct use in groundwater in the absence of stabilizing agents.

Therefore, in many cases the additivation on of stabilizing agents (for example natural polymers such as guar gum, carboxymethylcellulose, etcetera) is necessary in order to ensure a colloidal stability of the suspension compatible with the injection operations into the groundwater. Furthermore, once injected into the groundwater, the particles undergo filtration and deposition mechanisms inside the porous matrix of the aquifer. In many cases, an intense deposition of the particles nearby the injection point can cause a considerable reduction of the effectiveness and/or of the convenience of the "nanoremediation", and in particular can lead to:

a reduction in the influence radius of the injection: the particles deposit nearby the injection point, generating reactive zones of modest dimensions (influence radii lower than 1 m). For the purposes of remediation it is therefore necessary to increase the number of injection points for obtaining sufficiently large reactive zones, with a consequent increase of the overall remediation costs;

a clogging of the aquifer nearby the injection point: this causes an increase in the injection pressures, amplifies the risk of fracturing the filtering medium and induces the creation of preferential paths for the migration of the particle (heterogeneous distribution of the nanoreagent). The clogging also increases the chances of surfacing of the injected colloidal suspension on the surface;

a reduction in the contact between the particles and the contaminant, since it is not possible to control the area where the particles deposit creating the reactive zone.

It is evident that the disadvantages listed above are mainly due to the difficulties in conveying inside the filtering medium a particulate reagent in the form of an aqueous suspension.

In addition to the limits highlighted so far, strictly related to the colloidal stability and the conveyance to groundwater of particles suspensions, further problems related to the chemical stability of nanomaterials are highlighted. Zero-valent metal nanoparticles, and in particular zero-valent iron nanoparticles, are in fact characterized by a very high reactivity due to their small dimensions. These particles are therefore extremely sensitive to oxidation processes, even by the atmospheric oxygen or by the oxygen dissolved in water. This causes a potential passivation of the zero-valent metal particles and during the transport and storage stages of the material and a reduction in their effectiveness against contaminants.

The current methods for overcoming the problems related to the conveyance of the particles in the subsoil consist in using stabilizing agents, mainly of organic nature (for example polymers, surfactants), which modify the superficial properties of the nanomaterial and/or the theological behavior of the aqueous suspension containing it, improving its colloidal stability and groundwater mobility. These stabilizing agents in fact reduce the tendency of the particles to aggregate and to sediment during the stages of the suspensions storage and of the injection preparation, and they improve the particulate mobility during the groundwater transport, thus limiting the particles filtration phenomena and the consequent occlusion of the filtering medium.

Examples of the aforementioned processes are illustrated in the patent documents CN104722777, U.S. Pat. Nos. 7,635,236 and 9,983,327.

Examples of the aforementioned processes are also illustrated in the following scientific publications:

"Reduced aggregation and sedimentation of zero-valent iron nanoparticles in the presence of guar gum" A. Tiraferri, K. L. Chen, R. Sethi, M. Elimelech, and "Ionic Strength and Composition Affect the Mobility of Surface-Modified Fe0 Nanoparticles in Water-Saturated Sand Columns" N. Saleh, H. Kim, T. Phenrat, K. Matyjaszewski, R. D. Tilton, G. V. Lowry.

The use of stabilizing agents suitable for improving the conveyance of the particles inside the contaminated aquifer, however, can entail a series of secondary disadvantages:

possible reduction of the nanomaterials reactivity due to the adsorption of the stabilizing agent on the active surface of the particles;

problems associated with the effective dissolution of the stabilizing agent and possible contribution to the clogging of the aquifer due to the filtration of the undissolved fraction of the stabilizing agent present in suspension;

need of using even high concentrations of stabilizing agent (of the order of some g/L) with a consequent increase of the remediation costs.

To solve the problems related to the injection of microparticles and nanoparticles in porous media, some technological solutions have been proposed in order to synthesize microparticles and nanoparticles of different nature directly inside the contaminated aquifers, starting from the injection in groundwater of their precursors in a dissolved phase. In this way it is possible to overcome many of the limitations linked to the injection of particulate material into the aquifer. Examples of the aforementioned processes are illustrated in the patent documents U.S. Pat. No. 6,592,294B1 and U.S. Pat. No. 7,341,664B2.

Another example of the aforementioned process is illustrated in the scientific publication "Electrokinetic generation of reactive iron-rich barriers in wet sediments: implications for contaminated land management" of D. W. S. Faulkner, L. Hopkinson and A. B. Cundy.

However, none of the cited technological solutions relates to the production in filtering media of microparticles and/or nanoparticles based on zero-valent metals and in general to metal coverings of the filtering medium surface, thus not being able to overcome the limitations and the disadvantages above highlighted related to the conveyance of particulate based on zero-valent metals inside filtering media.

In particular, U.S. Pat. No. 6,592,294B1 describes a method for synthesizing apatite precipitates inside contaminated aquifers in order to form a reactive barrier for the immobilization of heavy metals and radionuclides. The goal is achieved by injecting calcium salts and phosphate in the groundwater that, mixing in the subsoil, induce the formation of apatite precipitates in the aquifer. U.S. Pat. No. 7,341,664B2, on the contrary, describes a method for the formation of biominerals directly in the subsoil that are used for the remediation of contaminated groundwaters. The method provides injecting nutrients into the groundwater to stimulate the activity of bacterial strains specialized in the formation of biominerals able to immobilize the contaminants (heavy metals) or to degrade them (chlorinated solvents).

The scientific publication by Faulkner et al. proposes a method for the generation in the subsoil of a reactive barrier consisting of precipitated having a high iron content. The method uses an electric field, applied through a pair of metal sacrificial electrodes, to induce in the subsoil a strong pH gradient responsible of the dissolution of the positive electrode. The iron ions released by the sacrificial electrode migrate towards the negative electrode and precipitate once in contact with areas of the aquifer with a neutral or basic pH, forming a reactive band with a high content of iron oxides.

Finally, the patent document WO2009140694A2 describes a method for the batch production of metal nanoparticles through the chemical reduction of metal salts by using organic reducing agents of natural origin (for example, plant extracts). The metal nanoparticles are then introduced into a contaminated medium in order to reduce the concentration of pollutants inside the medium itself. As an alternative, the method provides the possibility of injecting the organic reducing agent of natural origin into the medium in order to induce the reduction of the metal ions present inside the medium to form metal nanoparticles directly inside the medium itself. However, the use of organic reducing agents of natural origin does not ensure the formation inside the medium of particles actually made of zero-valent iron with good performances in terms of reactivity towards contaminants. In addition, with this method there are not produced, in addition to the nanoparticles, covering layers, even partial, of the filtering medium that can help to improve the effectiveness of the remediation.

Therefore, a need exists to synthetize directly inside filtering media microparticles and/or nanoparticles and/or layers of covering/coating of the filtering medium, even partial, based on zero-valent metals in order to overcome the limitations related to the conveyance of the particles themselves in filtering media; a need also exists to carry out such synthesis in simple and easily scalable operating conditions, using inexpensive reagents, as well as to obtain a product with a high content of zero-valent metals, equal at least to 0.5% by weight, and with good performances in terms of reactivity.

In summary then, up to the present time, to the knowledge of the Applicant, no solutions are known that allow the use of an inorganic reducing agent to produce directly inside filtering media microparticles and/or nanoparticles based on zero-valent metals and/or to create covering layers based on zero-valent metals for covering (or coating), even partially, the filtering medium that overcome the drawbacks highlighted above.

Therefore the Applicant, with the method according to the present invention, intends to remedy this deficiency.

SUMMARY

It is an object of the present invention to overcome the drawbacks of the known art related to the synthesis and to the conveyance of microparticles and nanoparticles based on zero-valent metals inside filtering media and/or to the formation of covering layers based on zero-valent metals for covering((or coating), even partially, the surface of filtering media that mainly aim at remediating contaminated aquifers and at treating waste waters.

In particular, the present invention face the objects of:

simplifying the dosage of microparticles and nanomaterials based on zero-valent metals in the subsoil, hampered by agglomeration, sedimentation and clogging phenomena of the filtering medium by means of a temporally and/or spatially separate injection of their precursors in dissolved phase in the filtering medium itself;

simplifying the creation of covering layers based on zero-valent metals for covering, even partially, the filtering media surface;

producing inside the filtering media particles and/or coverings comprising at least 0.5% by weight of at least one zero-valent metal, by using inexpensive reducers already used in some remediation actions;

producing microparticles and/or nanoparticles both adhered on the surface of the filtering medium and free to migrate inside the filtering medium (C) and/or inside the intergranular space and/or inside the voids thereof;

controlling the formation point of the microparticles and/or nanoparticles and/or coverings based on zero-valent metals inside the filtering medium;

modifying the mechanical and/or electrical and/or chemical and/or chemical-physical and/or microbiological and/or hydrodynamic and/or geochemical and/or geotechnical and/or superficial properties of filtering media and/or of possible fluids, static or in flow, contained therein;

optimizing remediation interventions of contaminated sites by generating directly inside the contaminated filtering medium microparticles and/or nanoparticles and/or reactive coverings based on zero-valent metals.

These objects are achieved with the methods according to the present invention that, advantageously and thanks to the reduction of metal salts directly inside a filtering medium, in the presence of one or more inorganic reducing agents, allow to produce zero-valent, and also multimetal, microparticles and/or nanoparticles made of a noble metal and/or a transition metal and/or a lanthanide and/or an actinide, in filtering media and/or to create a covering layer based on zero-valent metals for covering, even partially, the surface of the filtering media themselves. Specifically, the above-mentioned and other purposes and advantages of the invention, which will become apparent from the following description, are achieved with a method for the production in filtering media of microparticles and nanoparticles of zero-valent metals and for the creation of covering layers based on zero-valent metals for covering, even partially, the surface of filtering media as the one according to claim 1 or 2.

Preferred embodiments and variations of the methods according to the present invention form the object of the dependent claims.

It is understood that all of the appended claims form integral part, of the present description and that each of the technical features claimed therein is possibly independent and autonomously usable with respect to other aspects of the invention.

It will be immediately evident that several changes could be made to what described (for example related to shape, sizes, arrangements and parts with equivalent functionality) without departing from the scope of the invention as claimed in the appended claims.

Advantageously, the technical solution according to the present invention allows to:

produce microparticles and nanoparticles of zero-valent metals directly inside filtering media and/or their constituents and/or produce covering layers based on zero-valent metals for covering, even partially, the surface of filtering media by means of a chemical reduction of metal salts, with consequent overcoming of the drawbacks commonly noticed during the storage stage of microparticles and nanoparticles of zero-valent metals and by their injection and conveyance in filtering media;

produce microparticles and nanoparticles and/or coverings based on zero-valent metals directly inside filtering media using economic reducing agents;

produce microparticles and/or nanoparticles and/or bimetal coverings inside filtering media by exploiting the invention described in the Italian Patent application no. 102017000136603 filed on Nov. 28, 2017 and entitled "Method for the synthesis of microparticles and nanoparticles of a Zero-Valent metal in the presence of a noble metal", of the same Inventors, in order to synthesize directly inside the filtering medium bimetal particles made of a noble metal and a transition metal;

produce microparticles and nanoparticles and/or coverings based on zero-valent metals directly inside filtering media starting from precursors in solution. This considerably reduces the problems relevant to the transport in the field and to the storage of the nanomaterials, which in the form of a dry particulate can be pyrophoric while in an aqueous suspension they require addition of biopolymers in order to improve colloidal stability thereof;

produce microparticles and/or nanoparticles and/or mono- and polymetal zero-valent coverings starting from metal ions naturally present in the filtering medium, which therefore form SOL1;

produce microparticles and/or nanoparticles and/or mono- and polymetal zero-valent coverings through the combined action of an inorganic reducing agent (SOL2) and of an electric field in order to improve the quality of the produced material and the process yield;

produce coverings of the filtering medium based on zero-valent metals for the functionalization and/or modification of the properties of the filtering medium itself;

produce directly in the filtering medium microparticles and/or nanoparticles adhered onto the surface of the filtering medium and/or free to migrate inside it so as to distribute the zero-valent metals in a larger portion of the filtering medium itself;

produce microparticles, nanoparticles and/or coverings with a zero-valent metal content higher than 0.5% by weight inside the filtering medium;

modify the mechanical and/or electrical and/or chemical and/or chemical-physical and/or microbiological and/or hydrodynamic and/or geochemical and/or geotechnical and/or superficial properties of filtering media and/or of possible fluids, static or in flow, contained therein in a simple, rapid and non-destructive way;

remediate contaminated aquifers through injection into groundwater of solutes with low viscosity (solutions of metal salts and inorganic reducing agents) and not of colloidal suspensions (the reactive particles are formed directly in the subsoil). This allows to solve some problems related to the stabilization, injection and conveyance of colloids in porous media. The injection of solutions in groundwater has, in fact, a technical and operational complexity decidedly lower compared to the injection of particles: stabilizing agents increasing the viscosity of the injected fluid are not necessary, it is possible to reach high influence radii during the injection, the injection pressures are lower and the risks of fracturing the filtering medium are minimized, the problem of the intense deposition of the particles (and therefore of the clogging of the filtering medium) nearby the injection well is eliminated;

produce coverings of the filtering medium based on zero-valent metals to improve the performances of remediation interventions based on the concept of "nanoremediation";

control the portion of the filtering medium in which the synthesis of the particles and/or coverings, even partially, of the filtering medium surface occurs, and thus the formation of the reactive zone, by operating a temporally or spatially controlled injection of the reagents;

produce microparticles and/or nanoparticles and/or coverings based on zero-valent metals directly inside the filtering media by limiting the unwanted oxidation processes of the zero-valent metals caused by atmospheric and dissolved oxygen, which occur during the transport and storage stages of the particles and maximize their effectiveness against the contaminants;

produce microparticles and/or nanoparticles and/or coverings based on zero-valent metals directly inside filtering media in the absence of stabilizing agents that can inhibit reactivity. Moreover, the deposition of the particles and of the coverings produced inside the filtering medium is irreversible, allowing to concentrate the particles inside the reaction zone and nearby the contaminant source and to minimize the uncontrolled migration of the particles downstream the formation zone.

Moreover, the technical solution according to the present invention has the following advantages with respect to the known solutions:

economic advantage with a reduction in the unit cost per kg of zero-valent metals introduced in groundwater:
no commercial microparticles or nanoparticles are purchased, whose cost is the main cost item for remediation. The metal salts and the reducing agent have unit costs much lower than the commercial particles;
no stabilizing agents are used for improving the stability and the mobility of the particles;
no specific infrastructures are needed for the preparation on site of the colloidal suspensions and for the minimization of the oxidation of the zero-valent metal particles (for example controlled/modified atmosphere enriched with nitrogen or inert gases, high shear stress agitators);
possibility of using chemical reagents cheaper and of easy supply compared to the commercial microparticles and nanoparticles, such as metal salts and reducing agents such as borohydrides, diboranes, sulfates, sulfites, bisulfites, metabisulfites, dithionites, dithionates, thiosulfates, iodides and stannous chloride;
possibility of achieving high influence radii during the injection, with a consequent reduction in the number of employed wells;

technical/technological advantage with improvement of the remediation performances:
the particles and the coverings are generated directly inside the contaminated aquifer so as to minimize the passivation of their reactivity caused by the atmospheric oxygen;
the problems related to the transport of colloids in groundwater, such as particle filtration, clogging of the filtering medium, increase of injection pressures, are eliminated;
it is possible to produce the particles directly nearby the contaminated area, increasing the remediation effectiveness;
the microparticles and/or nanoparticles produced inside the filtering medium are partly adhered to the surface of the filtering medium itself and partly free to migrate inside thereof so as to allow the distribution of the zero-valent metals in a portion larger than that of the filtering medium itself;

it is possible to produce coverings of the filtering medium based on zero-valent metals besides the particles; in this way it is possible to increase the contact surface between the contaminants and the zero-valent metals, accelerating the removal processes of the contaminants;

if the reducing agent is dosed in excess, it actively contributes to the removal of the contaminant, increases the longevity of the particles and of the synthesized coverings in the filtering medium and favors the regeneration of zero-valent metals that have exhausted their reactivity;

possibility to synthesize inside the filtering medium bimetal particles by exploiting the invention described in the Italian Patent application no, 102017000136603 filed on Nov. 28, 2017 and entitled "Method for the synthesis of microparticles and nanoparticles of a Zero-Valent metal in the presence of a noble metal", of the same Inventors.

Additional objects and advantages of the present invention will appear more evident from the following detailed description.

BRIEF DESCRIPTION OF THE DRAWINGS

The present invention will be described hereinafter by means of some preferred embodiments, given by way of non-limiting example, with reference to the attached drawings. These drawings illustrate different aspects and examples of the present invention and, where appropriate, similar structures, components, materials and/or elements in different figures are denoted by similar reference numbers.

DETAILED DESCRIPTION OF THE EMBODIMENTS

Figure 1:
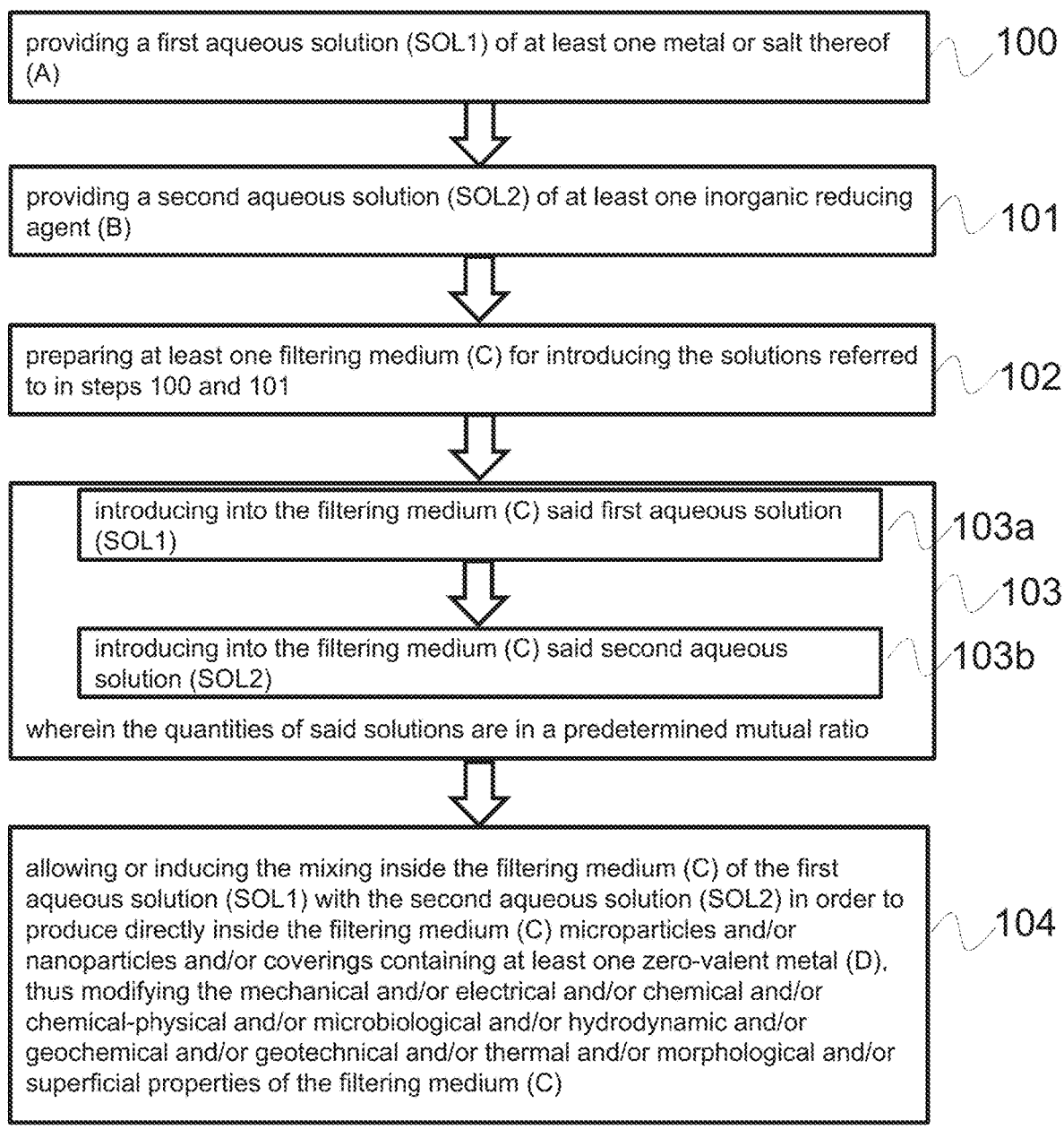
FIG. 1 is a flowchart showing the steps of the method for producing zero-valent metals in media according to the present invention.

While the invention is susceptible of various modifications and alternative constructions, some preferred embodiments are shown in the drawings and will be described in detail hereinbelow. It has to be understood, however, that there is no intention to limit the invention to the specific illustrated embodiments, but, on the contrary, the invention intends to cover all the modifications, alternative constructions, and equivalents that fall within the scope of the invention as defined in the claims.

In the following description, therefore, the use of for example, "etcetera", "or" indicates non-exclusive alternatives without any limitation, unless otherwise indicated; the use of "also" means "to choose from, but not limited to" unless otherwise indicated; the use of "includes/comprises" means "includes/comprises, but not limited to" unless otherwise indicated. The methods, the microparticles, the nanoparticles and the metal coverings and the filtering media covered with the reactive material of the present invention are based on the innovative concept of chemical reduction of a noble metal and/or of a transition metal and/or of a lanthanide and/or of an actinide in an aqueous phase carried out by an inorganic reducing agent directly inside a filtering medium, saturated or unsaturated, possibly, but not necessarily, mediated by a co-reduction of a noble metal.

The inventors have in fact surprisingly been found that the simultaneous or sequential injection of at least one inorganic reducing agent and of at least one salt of a metal, noble or transition or lanthanide or actinide or a mixture thereof, allows to form inside a filtering medium micrometric and/or nanometric, metal or multimetal, zero-valent particles and/or to produce a covering (or a coating), continuous or discontinuous, based on zero-valent metals on the surface of the filtering medium. Moreover, the Inventors have observed that the only inorganic reducing agent can be injected inside a filtering medium containing and/or consisting of one or more metals, or in a filtering medium containing therein a fluid containing metals, in order to produce micrometric and/or nanometric, metal or multimetal, particles and/or coverings based on zero-valent metals starting from the metals already present inside the filtering medium itself.

An important feature of said methods resides in the fact that they allow to induce the formation inside the filtering medium of nanoparticles and microparticles of zero-valent metal, yet movable in the interior thereof and/or adhered as a covering on the filtering medium itself, through the injection of solutions of soluble salts. The combination inside a filtering medium of a metal or of a salt thereof, or of a mixture of salts, with a solution of an inorganic reducing agent has proved to be capable of efficiently forming, directly inside the filtering medium, microparticles and/or nanoparticles and/or coverings of zero-valent metal (monometal or multimetal) able to carry out a decontamination of a pollutant entering the filtering medium or already present therein. Therefore, the present method allows to overcome the problems of aggregation, deposition, filtration and stabilization need usual to the injection of microparticles and/or nanoparticles in order to the remediation of filtering media, or to the generic introduction of microparticles and/or nanoparticles and/or to the formation of metal coverings in filtering media to obtain the functionalization thereof and/or to guarantee certain properties to them.

In the present description the term "filtering medium" means, by way of non-limiting example, porous media, granular media, fractured media, porous or filtering systems, packings and packed systems, systems of pores and/or channels and/or chambers interconnected among them, sponges, nets and reticular systems, elements with honeycomb structure, filters, fabrics, foams and expanded materials, biological filters; systems that allow filtration and/or infiltration and/or permeation and/or transport of fluids therein; more generally, in the present description the term "filtering medium" is meant to indicate a portion of matter consisting of "full" and "interconnected voids" suitable for making a fluid to flow inside it.

In the present description the term "layer/layers" means an amount of matter, homogeneous or heterogeneous, of various thickness, even extremely reduced, placed on a surface so as to cover it totally or partially.

In the present description the term "covering to cover" means the formation of a more or less homogeneous crystalline or amorphous layer, continuous or non-continuous, consisting mainly of zero-valent metals, oxides, borates and/or sulfides of the metals deposited on the free surface of the filtering medium; in the present description the terms "coating/to coat"; layers/covering layers/coating layers are used as synonyms of the term "covering/to cover" defined herein.

In the present description the term "Darcy velocity" means the specific flow rate per unit area, expressed in cm/min (centimeters per minute), of the fluid inside the filtering medium. This value is obtained by dividing the volumetric flow rate with which the reagents are introduced inside the filtering medium for the total surface (voids plus full) of the filtering medium section affected by the flow.

In the present description the term "pore volume" (PV in the text) means the volume of voids that form the filtering medium, instead, the term "pore volume time" (TPV) means the time required to replace all the volume of fluid contained in the voids of the filtering medium at a defined constant flow rate.

In the present description the term "noble metal" means copper, ruthenium, rhodium, palladium, silver, rhenium, osmium, iridium, platinum, gold and mercury.

In the present description the term "transition metal" means all the elements belonging to groups 3 to 14 of the periodic table, with the exception of the metals already included in the class of the noble metals according to the preceding definition.

In the present description the term "lanthanides" means all the elements comprised between lanthanum and hafnium on the periodic table, with atomic numbers between 57 and 71 included. In the present description the term "actinides" means all the elements comprised between the actinium and the lawrencium on the periodic table, with atomic numbers between 89 and 103 included.

In the present description the term "inorganic reducing agent" means borohydrides, diboranes, sulfates, sulfites and bisulfites, metabisulfites, dithionites, dithionates, thiosulfates, iodides and stannous chloride, or a mixture thereof.

In the present description the term "naturally oxygenated" means solutions whose oxygen content has not been modified by blowing gas to simulate the groundwater content, but it is only linked to the natural equilibrium with atmospheric oxygen.

In the present description the term "operating conditions of the method according to the present invention" means any conditions of temperature and pressure that allow the existence of a liquid phase; the method according to the present invention is able to carry out the present invention in porous media saturated both by water with a typical oxygen content of groundwater and surface water (therefore much higher); the method according to the present invention requires to operate at a pH such as to stabilize the reducing agent and in the preferred embodiment thereof the method according to the present invention provides neutral or alkaline pH.

In the present description, as far as the pH ranges are concerned, the term "stabilization" means the suppression of decomposition reactions of the reducing agent generally characterized by acid pH, the optimal pH for this stabilization, as mentioned above, depends on the type of the reducing agent used.

In the present description the term "protocol" means the set of necessary and accessory steps for producing microparticles and/or nanoparticles and/or coverings inside the filtering medium according to the present invention; the protocol according to the present invention provides that at least one solution containing one or more transition and/or noble and/or lanthanide and/or actinide metals (SOL1) and a solution containing at least one inorganic reducing agent (SOL2) are introduced inside the filtering medium; the solutions containing the inorganic reducing agents and the metal ions can be introduced sequentially from the same introduction point (differential introduction in time) or simultaneously from different introduction points (differential introduction in space). Eventually, but not necessarily, between the step of introducing the solution of metal salts and the step of introducing the reducing agent, an accessory step of introducing a third fluid having properties such that it interacts neither with the metal ions, nor with the inorganic reducing agent, nor with the filtering medium (for example water), to avoid the direct contact between the metal ions and the reducing agent, in order to control the mixing point thereof and the formation zone of the microparticles and/or of the nanoparticles and/or of the layer covering the filtering medium. In an alternative embodiment of the method, the protocol provides the injection of the sole solution of inorganic reducing agent (SOL2) inside a filtering medium already containing metals and/or consisting of metals and/or containing a fluid in which metals are present.

Optionally, but not necessarily, during one or more injection steps, an electric field can be applied inside the filtering medium and/or the fluid contained therein through two or more electrodes so as to further favor the reduction of metal ions to the zero-valent state. In its preferred form the method according to the present invention uses salts of iron, manganese or silver (or mixtures of the aforesaid or their alternate injections) and a reducing agent belonging to the following classes: borohydrides, dithionites, bisulfites, metabisulfites.

In the present description the term "cycle" means the set of the steps of introducing SOL1 and SOL2, and the accessory step of introducing the third fluid where it is considered necessary, in predefined amounts and speeds inside the filtering medium.

In summary, the present invention relates to a method for the controlled generation of microparticles and/or of nanoparticles and/or of a covering layer based on zero-valent metals, possibly multimetal, directly inside a filtering medium in order to modify the mechanical, chemical (for example reactivity), chemical-physical (for example the adsorption capacity), hydrodynamics (for example the porosity and/or the hydraulic conductivity), geochemical and/or superficial (for example the surface charge) properties. The synthesis product consists of microparticles and/or nanoparticles based on zero-valent metals and/or of a continuous or discontinuous layer based on zero-valent metals covering the filtering medium surface, as well as of the filtering medium covered by the layer (or layers) of zero-valent metal (or metals). The microparticles, the nanoparticles and/or the coverings are characterized by a zero-valent metal content equal to at least 0.5% by weight of their total mass. Moreover, the microparticles and/or the nanoparticles produced inside the filtering medium can be suspended and/or mobile inside the interstitial or intergranular spaces of the filtering medium and then transported inside it, or they can be adhered onto the surface of the filtering medium itself.

The main field of application of the present invention is related, but not limited, to the remediation of contaminated aquifers and/or to the modification of the physicochemical properties of the aquifer, to promote the removal of the pollutant through immobilization or transformation into harmless compounds. The ultimate aim of the present invention is the resolution of the previously described problems related to the applications of microparticles and nanoparticles of zero-valent metals connected to the high cost of the materials and to the complexity of their introduction inside the filtering medium. The object is achieved by injecting solutions inside the filtering medium, which is significantly less complex and more economical than the injection of colloidal suspensions consisting of preformed particles. Furthermore, during the process, also coverings of the filtering medium based on zero-valent metals are formed that support or replace the action of the microparticles and/or the nanoparticles. Finally, inside the filtering medium the conditions are more favorable to the reduction of metals and, therefore, blander reducing agents can be used.

The field of application of the present invention may also be related to the conditioning of filtering media, covering/coating of the surface of the grains or of the fractures of a filtering medium with colloidal particles, the creation of reactive filtering beds, the distribution of improvers in the filtering medium, the production of material for producing electrodes, conductive materials, catalytic and/or adsorbent surfaces and for the treatment of waste waters.

Figure 18:
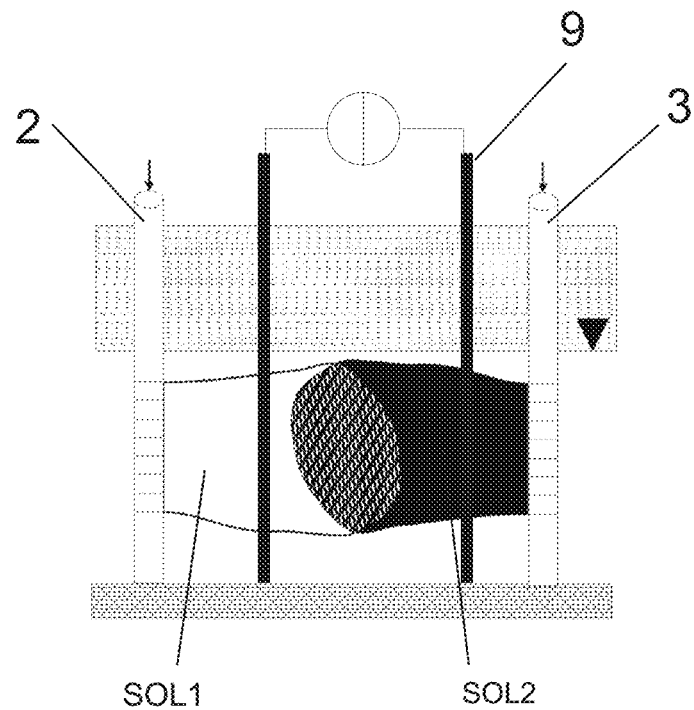
FIG. 18 represents a schematic table describing a possible way of application in contaminated aquifers of the method according to the present invention that provides the injection from different introduction points (2 and 3) of a solution of at least one metal and of an inorganic reducing agent and the application, where deemed to be preferred and/or necessary, of an electric field (9) to favor the production of zero-valent metals in filtering media.

The preferred embodiment of the present invention refers to the synthesis of microscopic or nanoscopic zero-valent iron, to be used for the remediation of contaminated aquifers, in the soil and/or in the subsoil, and in particular in the vadose area, or the capillary fringe or aquifer systems (artesian and/or phreatic groundwaters) in order to reduce the high costs currently still excessive for economically advantageous applications of such interventions on a large-scale. FIGS. 1 and 18 present schematic representations of preferred ways of application of the method for producing zero-valent metals in filtering media finalized to the remediation of contaminated aquifers according to the present invention.

An alternative form of the present invention refers to the modification of the mechanical and/or electrical and/or chemical and/or chemical-physical and/or microbiological and/or hydrodynamic and/or geochemical and/or geochemical and/or superficial properties of a filtering medium and/or of a fluid that passes through it. An example of application of this method concerns the production of reactive materials immobilized on a reactive or inert support or matrix, in order to improve the technical features thereof some examples concern the immobilization on porous solids (zeolites, filtering polymer) or on inert material supports (beads, glass capillaries).

Another embodiment of the present invention refers to the synthesis of microparticles and/or nanoparticles and/or coverings inside the filtering medium in the presence of other materials having a stabilizing, dispersing or supporting function.

A first aspect of the present invention relates to the reduction of a noble or transition metal or lanthanide or actinide, or of a mixture thereof, inside a filtering medium characterized by the presence, inside it, of a generic fluid in natural or forced flow (F), with a flow rate continuous or variable over time. The reduction is carried out by mixing, inside the filtering medium, at least one solution of at least one metal or of one of its salts (SOL1) and at least one solution of at least one inorganic reducing agent (SOL2). The metal is preferably selected from Fe(II) Ag(I), Cu(II), Cu(I), Zn(II); the reducing agent is preferably selected from borohydrides, diboranes, sulfates, sulfites and bisulfites, metabisulfites, dithionites, dithionates, thiosulfates, iodides and stannous chloride, or a mixture thereof. In an alternative embodiment, the inorganic reducing agent is injected directly inside a filtering medium containing metals (or containing a fluid containing metals) and the method does not require the injection of the SOL1 solution.

A second aspect of the present invention relates to the optional use of a noble metal, preferably Ag or Cu, in order to generate more favorable conditions for the reduction of a second metal belonging to the class of the transition metals and to guarantee better properties to the microparticles and/or nanoparticles and/or bimetal coverings. The Inventors have in fact previously found that the presence, even in extremely low concentrations, of a noble metal as a dissolved ion or as a metal of micrometric and/or nanometric size inside a solution of reducing agent favors the reduction of a transition metal. The reduction of the noble metal may occur previously or concomitantly with the reduction of the transition metal.

A third aspect of the present invention relates to the preparation of the solutions of the metal salts and of the reducing agent. The concentration of the metal(s) and of the reducing agent can range between 0.001 mM and the saturation limit for the metal salt and for the reducing agent. Preferably, the concentration of the inorganic reducing agent (or agents) ranges between 0.1 and 50 times the stoichiometric amount to completely reduce the total metal injected in step 103a; the pH of the reducing agent solution is modified so as to stabilize it, the pH value therefore depends on the selected reducing agent. Preferably the pH value ranges between 3 and 14, preferably between 8 and 12.

Another aspect of the present invention relates to the injection of a third fluid (SOL3) having a different composition (as to constituents or concentration) with respect to SOL1 and SOL2, interposed between the injection steps of the two solutions and/or between successive cycles of application of the method, in order to control the mixing point and the formation zone of microparticles and/or nanoparticles and/or coverings of the filtering medium. In a preferred embodiment the fluid forming the SOL3 is water.

Another aspect of the present invention relates to the repetition of the steps of the method, including a possible injection of a third fluid SOL3 intermediate between the aforesaid steps (as from the previous point) and a possible injection of this third fluid between the repetitions. These repetitions can be carried out in the same way, or in different ways with respect to the first injection cycle. Similarly, the solutions SOL1, SOL2 and SOL3 used for the repetitions may coincide or differ, as to concentration or composition, from the corresponding solutions used in the previous injection.

Another aspect of the present invention relates to the modes of introducing the aforementioned SOL1 and SOL2, and possibly SOL3, inside the filtering medium. If appropriately used according to the provisions of the present description, all the known injection types can be used for introducing the colloidal suspension and the inorganic reducing agent in the subsoil. The following are examples of some of the reagents dosing techniques commonly used in the field of remediation of contaminated aquifers and that can be used, as such or with appropriate modifications, for the application of the present method:

injection of colloidal suspensions inside piezometers or traditional wells equipped with single or double "packers", possibly with the possibility of multilevel injections;

use of direct fixing systems that allow the reagent products to be injected directly into rods during the drilling step, the so-called "direct push" techniques;

dosage on the free surface of the groundwater by means of infiltrating trenches. This injection technique can only be used in the case of rather superficial contaminations and in particularly permeable soils, which allow the infiltration of the reactive material only by gravity.

However, the injection technique does not represent a limiting factor in the application of the proposed method, therefore also other techniques, conventional and not, for introducing liquid phase substances in the subsoil, or more generally in filtering media, can be applied without change the validity of the method.

The introduction of the SOL1 and SOL2 solutions can be concomitant or not in time (in the case of simultaneous addition it is preferable that the introduction takes place from different channels for the metal and the reducing agent), as well as the addition of the reducing agent can precede or follow the addition of the salts. The introduction of the SOL1, SOL2 solutions can also be concomitant or not in space, which is intended as latitudinal and/or vertical distance between the injection zones and in this case the addition can also be concomitant or not also in time. The injection methodology (well, trench, etcetera) may or may not be common to all the solutions. The introduction of the SOL3 solution can be consecutive to the injection of the SOL1, of the SOL2 or of the injection of both according to the modes described above. In a preferred embodiment the injection of the SOL3 takes place from one or more points used for the introduction of SOL1 and/or SOL2. By modulating introduction modes, the amounts introduced, the flow rates used and the duration of the individual steps of introduction of the third fluid, it is possible to control the mixing point and therefore the formation zone of the microparticles and/or nanoparticles and/or coverings of the filtering medium.

A further aspect of the present invention relates to the methods of introduction of the solutions, regardless of the concomitant or deterred modes described above, such as the amounts introduced, the flow rate used and the duration of the individual steps. The introduction can take place at a constant flow rate throughout the whole protocol, at a variable flow rate (increasing flow rate, decreasing flow rate, pulses, flow rate steps). Moreover, the flow rate can be alternated and/or realized with a local inversion of the base flow (F) and/or of the flow generated in the preceding injection step. A further aspect of the present invention is related to the execution of the proposed method with the aim to bring back to the zero-valent state preexisting microparticles and/or nanoparticles and/or coverings of the filtering medium (obtained with the same protocol or a different protocol) or microparticles and/or nanoparticles otherwise introduced that have changed their oxidation state following aging, oxidation caused by dissolved oxidizing agents, and/or chemical and/or biological reaction. A variant of this aspect is relevant to the execution of the protocol wherein the concentration of the metal in SOL1 is lower than 0.1 mM and wherein the step 103b aims at carrying out the reduction to zero-valent inside the filtering medium of the already present, naturally or for previous interventions, metal ions.

A further aspect of the present invention relates to the use of electric fields, applied to and/or inside the filtering medium with the aim of further promoting the reduction of the metal salts injected in step 103a. The application of the electric field favors the formation of zero-valent metals inside the filtering medium even in the presence of weaker inorganic reducing agents. In fact, the absorbed electric energy, which inside the filtering medium is converted into chemical energy, represents an additional source of electrons used to support the reduction reaction of the metals to the zero-valent state. The application of the electric field also favors the migration and distribution of the metal ions, of the inorganic reducing agent and of the metal particles formed inside the filtering medium through electro-migration and/or electro-osmosis mechanisms. Finally, the electric field supports the reactivity of the particles and of the coverings based on zero-valent metals produced in the filtering medium inducing optimal conditions for the electro-assisted degradation of the contaminants. The electric field is applied inside the filtering medium by means of at least two electrodes that can be fixed inside the filtering medium, installed in concomitance of the introduction points of the reagents (for example inside the wells or injection piezometers) and/or coincide with them or they can be made directly in the subsoil through localized injection of highly conductive material.

A last aspect of the present invention relates to the application of the method for the remediation of contaminated aquifers, wherein the microparticles and/or nanoparticles and/or coverings based on zero-valent metals are produced directly inside the aquifer. During the formation of zero-valent metals in the subsoil, or subsequently to it, the contaminants come into contact, naturally or by force, with the zero-valent metals with which they interact: physically, chemically and/or chemically-physically. This interaction determines the degradation, transformation and/or immobilization of the pollutants and the consequent remediation of the contaminated aquifer system.

With reference to FIG. 1, the method for producing microparticles and/or nanoparticles and/or coverings based on zero-valent metals inside a filtering medium (A) according to the invention comprises the steps of:

providing a first solution (SOL1) of at least one metal or of one of its salt (B), or of salts of different metals, noble and/or transition and/or lanthanide and/or actinide (step 100)

providing a second aqueous solution SOL2 of an inorganic reducing agent (C) (step 101)

providing the filtering medium in conditions to allow the introduction of the solutions referred to in steps 100 and 101 (step 102)

introducing inside the filtering medium said solutions SOL1 (step 103a) and SOL2 (step 103b), wherein the amounts of said solutions are in a predetermined mutual ratio;

allowing or inducing the mixing inside the filtering medium (A) of the first aqueous solution SOL1 and of the second aqueous solution SOL2 inducing the reduction to the zero-valent state of the metal ions and generating microparticles and/or nanoparticles and/or coverings based on zero-valent metals.

According to an alternative embodiment, the method for producing microparticles and/or nanoparticles and/or coverings based on zero-valent metals inside a filtering medium (C) according to the invention is applied to a filtering medium containing metals (or containing a fluid containing metals) and comprises the steps of:

providing a second aqueous solution SOL2 of an inorganic reducing agent (C) (step 201)

providing the filtering medium containing metals (or containing a fluid containing metals)) for the injection of SOL2 (step 202)

introducing inside the filtering medium said SOL2 solution (step 203)

allowing or inducing the mixing inside the filtering medium (C) of the second aqueous solution SOL2 and of the metals contained in the filtering medium (C), and/or in the fluid contained therein, inducing the reduction to the zero-valent state of the metals and generating microparticles and/or nanoparticles and/or coverings based on zero-valent metals.

According to a further alternative embodiment, the method for producing microparticles and/or nanoparticles and/or coverings based on zero-valent metals inside a filtering medium (C) according to the invention is applied for the remediation of a contaminated filtering medium and comprises the steps of:

providing a first solution (SOL1) of at least one metal or of one of its salts (A), or of salts of different metals, noble and/or transition and/or lanthanides and/or actinides (step 300)

providing a second aqueous solution SOL2 of an inorganic reducing agent (B) (step 301)

providing the contaminated filtering medium in conditions to allow the introduction of the solutions referred to in steps 300 and 301 (step 302)

introducing inside the filtering medium said solutions SOL1 (step 303a) and SOL2 (step 303b), wherein the amounts of said solutions are in a predetermined mutual ratio allowing or inducing the mixing inside the filtering medium (C) of the solutions inducing the reduction to the zero-valent state of the metals and generating microparticles and/or nanoparticles and/or coverings based on zero-valent metals (step 304)

allowing or inducing the contact between the contaminants and the microparticles and/or nanoparticles and/or coverings containing at least one zero-valent metal to induce the degradation, transformation and/or immobilization of the contaminants (step 305).

According to a preferred, but not exclusive, embodiment, step 103 or 303 is carried out by injecting in sequence SOL2 and then SOL1, where the volume of SOL1 ranges between 0.001 and 1,000 times the injected volume of SOL2. According to a preferred embodiment, steps 103a and 103b or 303a and 303b are separated from each other by the injection of a third fluid having properties such that it interacts neither with the metal ions, nor with the inorganic reducing agent, nor with the filtering medium (for example water), for a time period ranging from 1 min to 12 h, and/or SOL2, for a time period ranging from 1 min to 12 h.

According to another preferred, but not exclusive, embodiment, steps 103a and 103b or 303a and 303b are carried out simultaneously, by introducing SOL2 and SOL1 from two different introduction points or from the same introduction point but at different levels or heights to define a different geometry of the reactive zone.

The method according to the present invention can also, optionally, comprise one or more of the following steps:

adding the SOL1 or SOL2, or both, one or more stabilizing agents, such as organic and/or inorganic polymers, surfactants and/or polyelectrolytes, etcetera to modify the properties (e.g. chemical affinity and/or mobility) of said particles and/or to modify the viscosity and/or the density of SOL1 and SOL2 to control and/or to improve their migration and mixing inside the filtering medium;

repeating at intervals more operations according to step 103, from an injection of a third fluid (SOL3), for a time period ranging between 1 min and 12 h and/or SOL2, for a time period ranging between 1 min and 12 h, in order to improve the efficiency of the next step.

According to another preferred embodiment, any of the steps of the method is carried out in the presence of an electric field applied to and/or into the filtering medium (or to the fluid inside it) in order to support the zero-valent reduction reaction of the metals by one or more reducing agents.

Preferably the electric field is applied to the filtering medium by means of electrodes fixed, installed or made in the filtering medium as described above. In this variant of the method, the electric field can be alternately applied by imposing a constant current or a constant potential on the electrodes. Preferably the applied electric field must be such as to guarantee a current density inside the filtering medium ranging between $0.0001$ $A/cm^2$ and $1,000$ $A/cm^2$ and an electrical potential gradient ranging between $0.0001$ $V/m$ and $1,000$ $V/m$. Preferably the polarity to the electrodes can be cyclically inverted to avoid polarization around the electrodes, to support the formation of the particles and of the coverings based on zero-valent metals and to favor the migration of metal ions, of the inorganic reducing agent and of the particles formed in the filtering medium.

Preferably during step 103 or 303, the injected volume of SOL2 ranges between 0.001 and 1,000 times, more preferably between 1 and 50 times, with respect to the injected volume of SOL1.

Preferably during step 103 or 303 the injected volume of SOL1 ranges between 0.001 and 1,000 Pore Volume.

Preferably SOL2 has a pH value ranging between 3 and 14, preferably between 8 and 12.

Preferably, during steps 103, 203 or 303 the injections are carried out at a flow rate ranging between 0.001 ml/min and 1,000 l/min, locally inducing a Darcy velocity ranging between 0.001 m/day and 100 m/day.

In general, the introduction of the reagents inside the filtering medium in step 103, 203 or 303 preferably takes place under the following conditions:

reagents concentration: the method can be carried out with concentrations ranging from 1 μM and the maximum concentration established by the solubility of the salts used (both the salts of noble metals, transition metals, lanthanides and actinides and the salts of the reducing agent C); in its preferred embodiment, the method is carried out with solutions at a concentration ranging between 1 mM and 1 M;

times: the times for step 103 are established by the value of Pore Volume for the specific filtering medium, therefore also by the flow rate used for the injection. In its preferred embodiment the duration of a single solution injection ranges between 0.001 and 1,000 PV, preferably between 0.5 and 10 PV;

injection flow rate: the injection flow rate ranges between 0,001 ml/min and 1,000 l/min, such as to locally induce a Darcy velocity ranging between 0.001 m/day and 100 m/day;

pH: ranges between 0 and 14, preferably between 6 and 14, preferably between 8 and 12;

injection cycles: the method can be carried out with a number of cycles ranging between 1 and $10^4$, where the term "cycles" means the execution of the steps 100 to 104 or 201 to 204 or 300 to 305, where the conditions (intended as concentration and composition of the solutions (SOL1, SOL2 and SOL3), type of injection, modes of injection such as flow rate, Darcy velocity, etcetera) may be different between the different cycles. In its preferred form the method is carried out with three injection cycles;

water injection between cycles and/or steps: the method can be carried out with or without injection of a volume of water ranging between 0.001 and 1,000 PV between injection cycles and/or between the execution of steps 103a and 103b or 303a and 303b; in its preferred form the method performs the injection of water for 0.5-5 PV.

Figure 2:
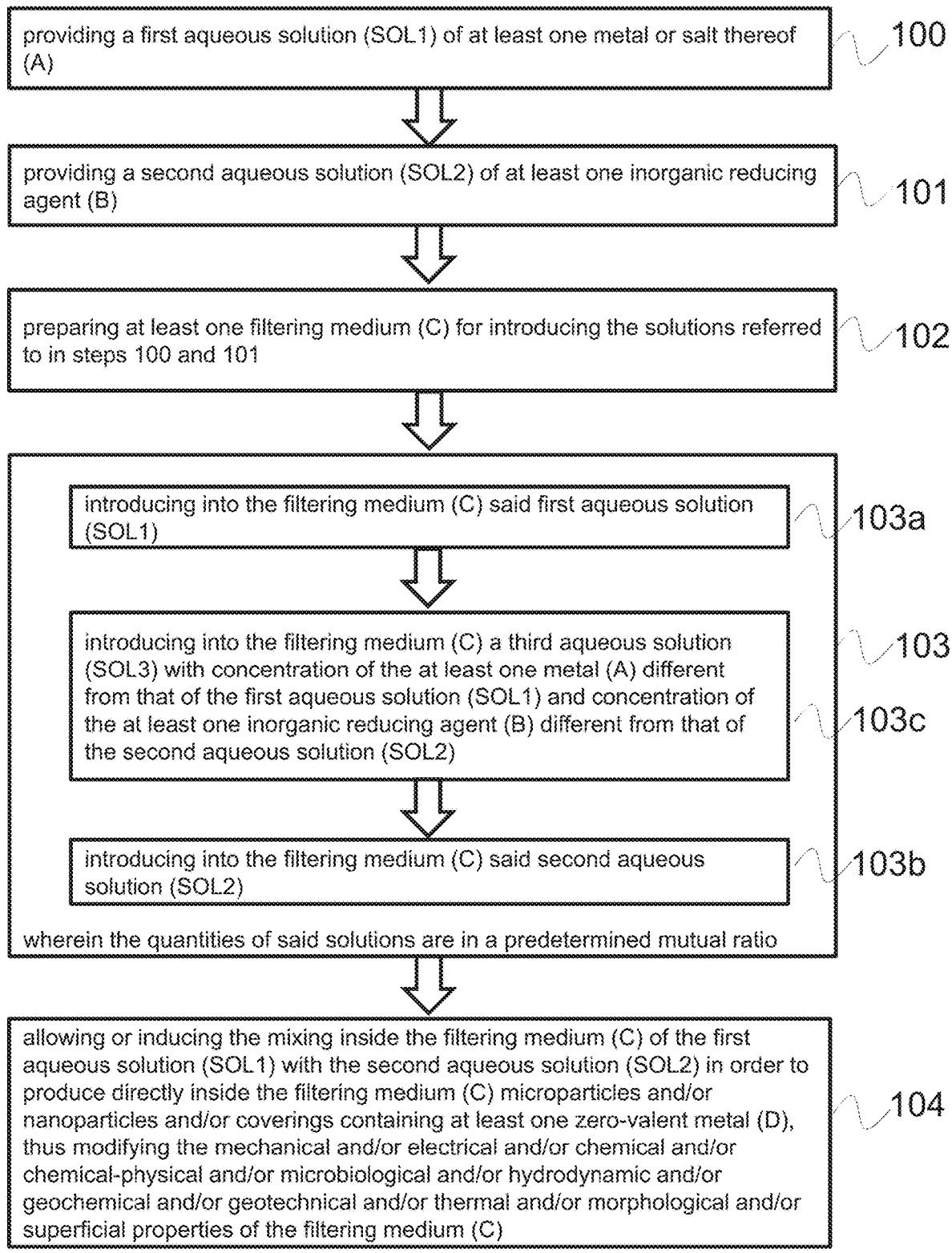
FIG. 2 is a flowchart showing the steps of the method for producing zero-valent metals in media according to the present invention in the case that the optional step 103c of introducing inside the filtering medium (C) a third solution (SOL3) is inserted between the introduction steps of SOL1 (step 103a) and of SOL1 (step 103b).

With reference to FIG. 2 a preferred embodiment of the method for producing microparticles and/or nanoparticles and/or coverings based on zero-valent metals inside of a filtering medium (C) is outlined, in which between step 103a introducing SOL1 and step 103b introducing SOL2 the additional step 103c introducing a third fluid (SOL3) is inserted, having a different composition (for constituents or concentration) with respect to SOL1 and SOL2, in order to control the portion of the filtering medium wherein the mixing of SOL1 and SOL2 takes place and the consequent formation of microparticles and/or nanoparticles and/or coverings based on zero-valent metals.

EXAMPLES

Some examples of practical applications for the synthesis of microparticles and/or nanoparticles and/or coverings based on zero-valent metal (or metals) inside a filtering medium are now reported. In all the described cases, the synthesis of the metal nanoparticles and of the covering on the filtering medium itself was obtained by preparing the solutions immediately before the test starting from commercial salts with known and certified purity, in deionized water of ultrapure degree.

Example 1

A first exemplifying embodiment relates to the synthesis of zero-valent iron particles in a filtering medium carried out through a single injection cycle. The filtering medium consists of silica sand. (Dorsilit n. 7, Dorfner, nominal average size $dSs=0.87$ mm) packed in a laboratory cylinder and saturated with deionized water. Inside it, 10 ml of ferric chloride solution (SOL1) at a concentration of 40 mM and 10 ml of an inorganic reducing agent solution (SOL2) prepared using sodium borohydride at a concentration of 100 mM were simultaneously introduced through a syringe. The reducing agent solution was prepared by maintaining a pH value of 10.5 with the addition of sodium hydroxide. At the end of the injection, the mixing of the two solutions inside the filtering medium was induced by means of extraction and reinjection cycles carried out through a syringe. The mixing step had a total duration of 2 minutes. At the end of the process, all the residual supernatant was removed and the filtering medium was rinsed three times with deionized water.

Figure 3:
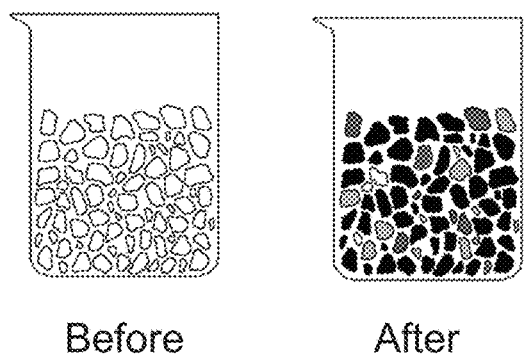
FIG. 3 shows the picture of the filtering medium of Example 1 consisting of quartz sand before and after the application of the method according to the present invention, in which the formation of zero-valent metals on the surface of the sand grains is evident.

The formation of black particles based on zero-valent iron on the surface of the sand grains is already evident from the first moments of the mixing. As shown in FIG. 3, at the end of the washing the grains of the filtering medium have a dark color due to the partial covering based on the zero-valent metal.

Example 2

Figure 5:
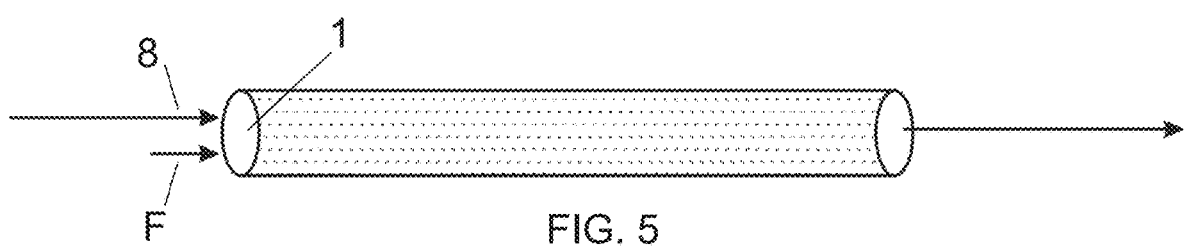
FIG. 5 schematizes the application of the method according to the present invention as applied in Example 2, in which the solutions containing metal ions and an inorganic reducing agent have been sequentially introduced and from the same injection point 1, with a flow rate 8, in a filtering medium in which the flow rate F of the bottom fluid, specifically water, has never been interrupted.

A second exemplifying embodiment relates to the synthesis of zero-valent iron particles in a filtering medium in which a fluid is present in a continuous flow induced by means of a peristaltic pump. The filtering medium consists of a 20 cm long chromatographic column packed with silica sand (Dorsilit n. 7, Dorfner, nominal average size dSs=0.87 mm) saturated with deionized water. With reference to FIG. 5, the flow of a fluid (F), consisting of deionized water, was forced inside the filtering medium at a flow rate of 0.5 ml/min through the injection point 1. The bottom flow of the fluid (F) has been kept active during all the application steps of the method of this invention. From the same injection point 1 the solution of metal ions (SOL1) and the inorganic reducing agent (SOL2) were then sequentially injected inside the filtering medium with an additional flow rate 8 equal to 1 ml/min. The solution of the metal salt was prepared using a heptahydrate ferrous sulfate at a concentration of 40 mM, the solution of the reducing agent was prepared using sodium dithionite at a concentration double than that of iron, bringing the pH value to 12.5 with sodium hydroxide. The production of zero-valent metal, specifically iron, was carried out through a single injection cycle, according to the following steps:
 a) preconditioning of the filtering medium with deionized water for about 30 minutes;
 b) injection of SOL2 for a time period of 15 minutes;
 c) injection of SOL1 for a time period of 15 minutes;
 d) washing with deionized water for 10 minutes.

Figure 4:
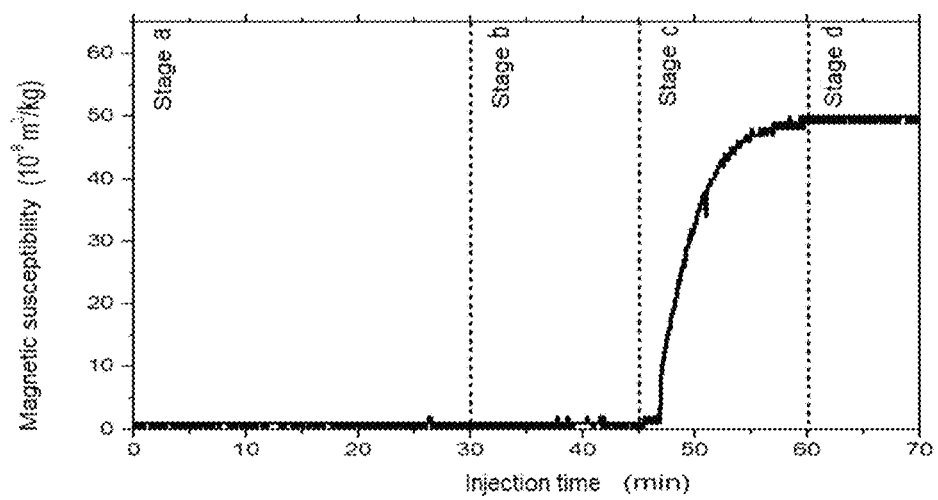
FIG. 4 illustrates the increase in magnetic susceptibility over time (proportional to the concentration of zero-valent iron) inside a filtering medium, which is an index of the formation of particles and coverings based on zero-valent metals directly inside the filtering medium and without interrupting the flow rate of the bottom fluid according to the method according to the present invention.
Figure 6A:
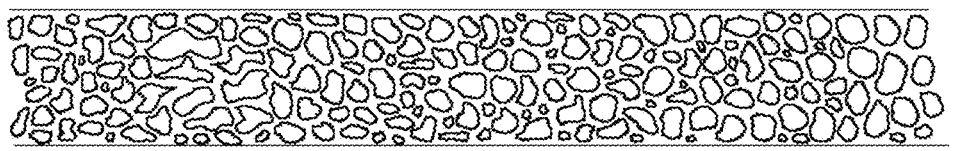
FIGS. 6A and 6B refer, respectively, to the filtering medium of Example 2 before and after the application of the method for producing zero-valent metals in filtering media, in which the formation of the particles and of the coverings based on zero-valent metals inside the filtering medium is evident.
Figure 6B:
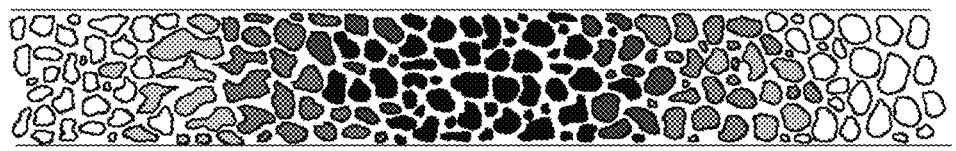
Figure 7A:
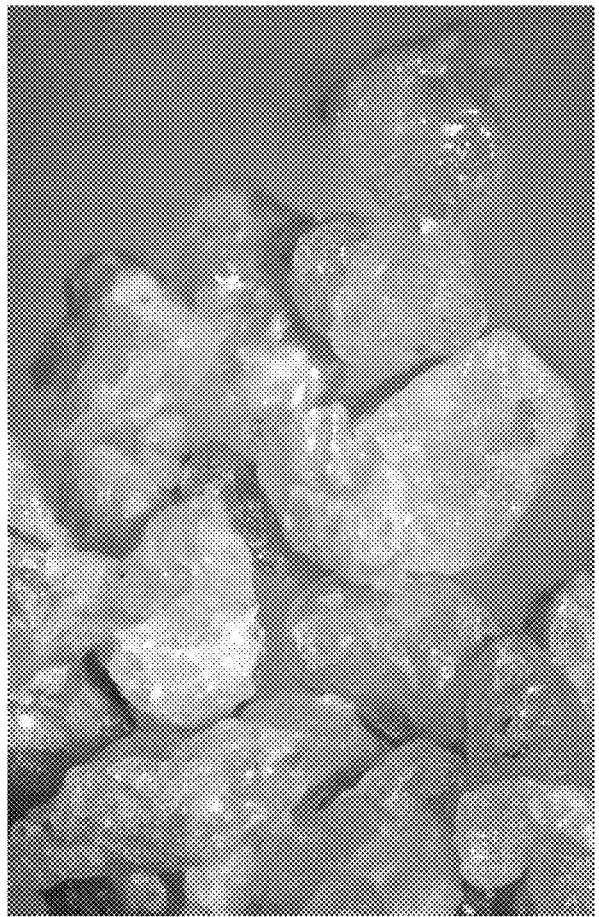
FIGS. 7A and 7B show optical microscopies of the sand grains forming the filtering medium of Example 2 respectively before and after the application of the method for producing zero-valent metals in filtering media, in which the formation of the particles and of the coverings based on zero-valent metals inside the filtering medium is evident.
Figure 7B:
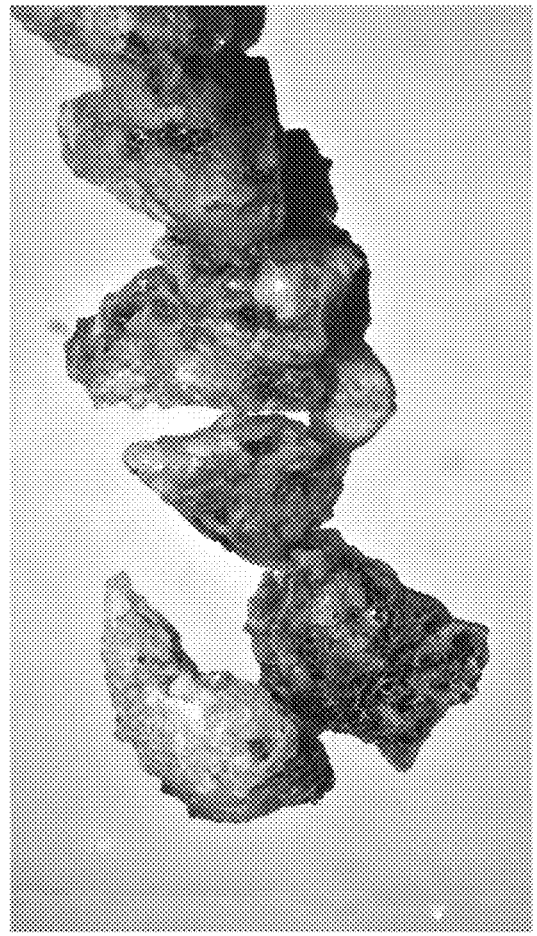
Figure 8:
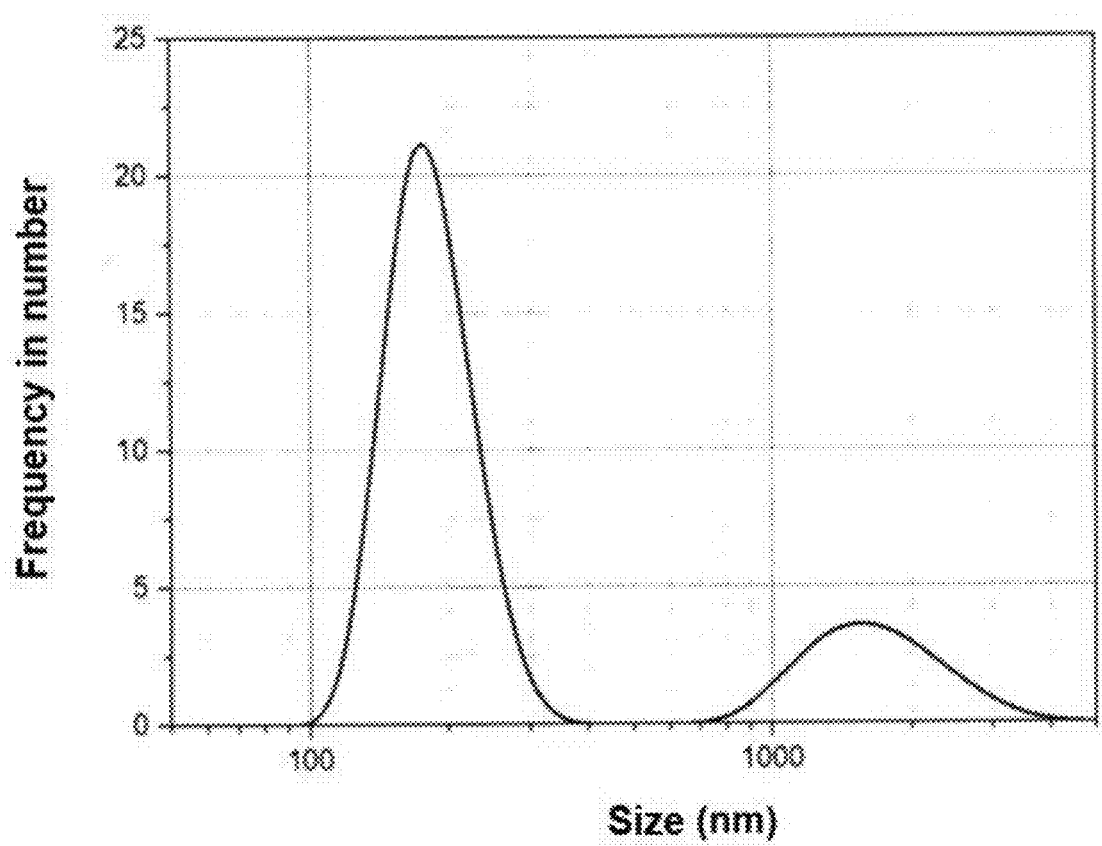
FIG. 8 represents the result of a dimensional analysis of the microparticles and nanoparticles produced inside the filtering medium of Example 2 by means of the application of the method for producing zero-valent metals in filtering media.
Figure 9A:
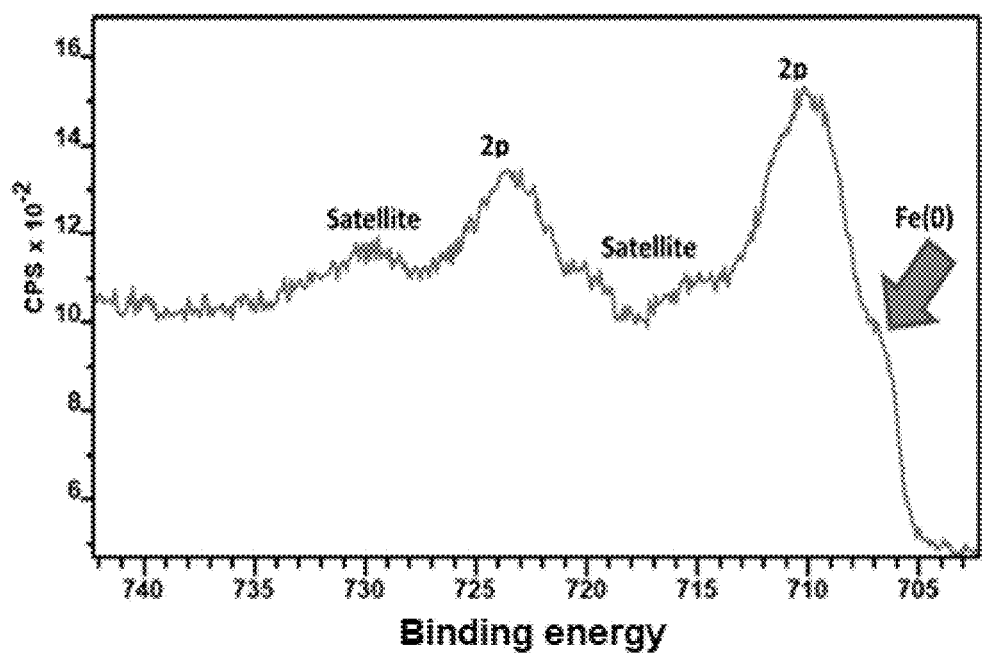
FIGS. 9A and 9B illustrate the XPS analysis of the microparticles and nanoparticles produced inside the filtering medium of Example 2 by means of the application of the method for producing zero-valent metals in filtering media.
Figure 9B:
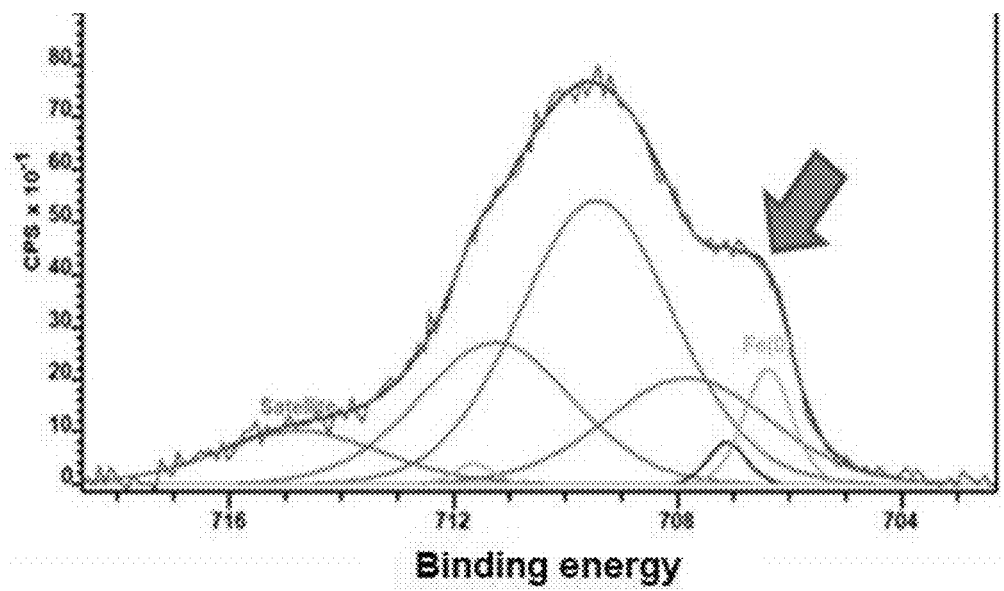

With reference to FIG. 5, it can be observed that the reducing agent and the metal sail are injected from the same point but at different times, carrying out a delayed injection in time according to the method of the invention. Therefore, the mixing of the two solutions takes place due to the hydrodynamic dispersion and to the different advancement speed of the two compounds inside the filtering medium. With this protocol, the whole filtering medium is affected by the formation of the microparticles and of the nanoparticles and of the layer adhered to the surface of the medium itself. By controlling the duration of the injection times it is possible to involve a lower portion (or partial and not complete) of the filtering medium. In the case of applications at the field scale, the duration of each injection step is decided depending on specific considerations relating to the characteristics of the contaminated site, better if previously calibrated through experimental laboratory tests. Result: FIG. 4 shows the evolution of the magnetic susceptibility at the center of the column, directly proportional to the produced amount of zero-valent iron. A significant increase in magnetic susceptibility at the beginning of step "c" was recorded, with a value that stabilized at around $55*10^{-8}$ m$^3$/kg. This increase is directly related to the formation of zero-valent iron, both as a suspended particle and a layer adhered to the filtering medium. No particle came out from the filtering medium. This can be attributed to an immediate deposition of the particles on the surface of the grains of the filtering medium, also due to the absence of stabilizing agents. FIGS. 6A and 6B show graphic representations of the filtering medium before and after the application of the method, respectively. From the figures it is possible to notice a change in the color of the sand, which takes a color tending to black due to the formation of zero-valent metals on the surface of the grains. This result is consistent with what was observed during the tests in the absence of a bottom flow (Example 1). The microscopy analyzes performed on the sand grains before and after the application of the method (see FIGS. 7A and 7B) have shown that zero-valent iron is present both in the form of particles adhered on the surface of the grains and as a more or less continuous superficial layer that covers the surface of the grains themselves (darkening of the sand grains). The dimensional analysis of the particles formed inside the filtering medium demonstrated the presence of particles both of nanometric size, about 200 nm, and of micrometric size, about 1.5 μm (see FIG. 8). The XPS analysis of particles performed on a column portion has confirmed the presence of good amounts of zero-valent iron both inside the particles in suspension and in the coveting layer of the filtering medium (see FIGS. 9A and 9B).

Example 3

Figure 10:
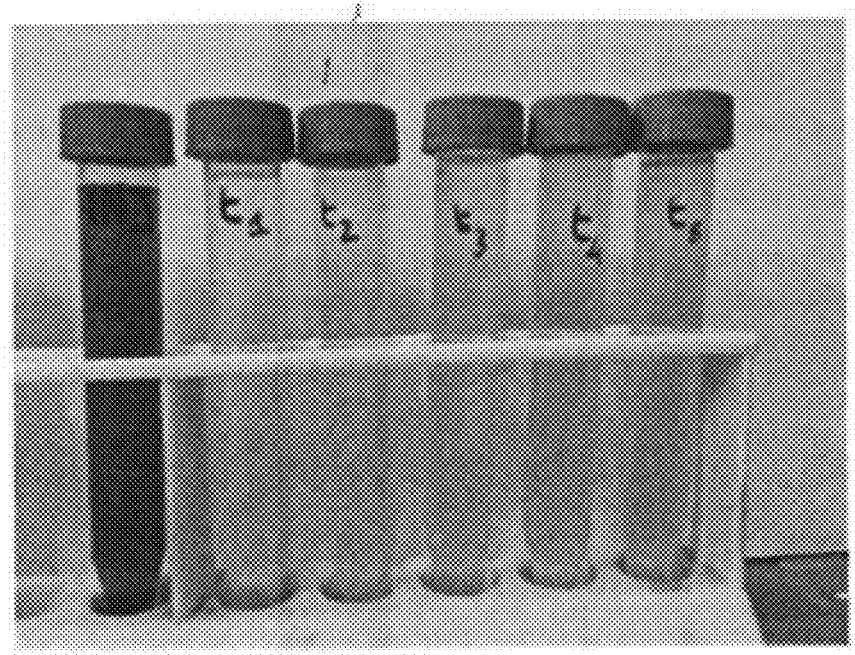
FIG. 10 shows the sample of model contaminant injected inside the filtering medium of Example 3 and the samples of purified water recovered upon exiting from the filtering medium itself, in which the contaminant was degraded thanks to the presence of the particles and of the coverings based on zero-valent metals produced directly inside the filtering medium itself according to the present invention.
Figure 11:
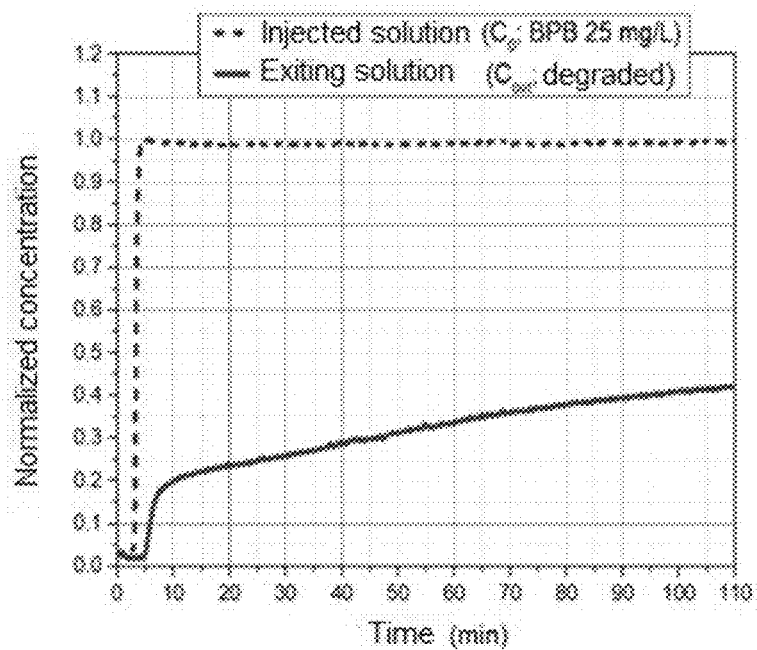
FIG. 11 shows the concentration curve of the model contaminant, normalized with respect to the concentration of injected dye, monitored over time upon exiting from the filtering medium of Example 3, in which particles and coverings based on zero-valent metals according to the present invention were previously produced.

The application of the present method for the production of zero-valent metals in filtering media to the chromatographic column of Example 2 has led to the modification of the chemical-physical properties of the filtering medium itself, making it reactive with respect to contaminants. To verify this result, at the end of the application of the method according to the present invention, a test to evaluate the reactivity of the filtering medium against a model pollutant was performed on the chromatographic column of Example 2. For this purpose a fluid (F) consisting of a dye solution, specifically bromophenol blue, was injected in the same column at the flow rate of 1.5 ml/min for a total time of 1 hour and 50 minutes. The zero-valent iron produced inside the filtering medium proved to be able to degrade such compound by making it colorless, so modifying the chemical and toxicological properties of the fluid (F) when it was passing through the filtering medium. FIG. 10 shows a graphic representation of the injected dye solution (sample on the left denoted as MI) and of five samples of purified water (samples denoted as t1, t2, t3, t4, t5) collected every fifteen minutes upon exiting the column. The graph in FIG. 11 shows the dye concentration curve monitored during the time upon exiting the column normalized with respect to the concentration of the dye upon entering. It is noted that for an injection longer than 1 hour (110 minutes) the concentration upon exiting the column remains lower than 50% of that upon entering, to further confirm the formation of the zero-valent iron inside the filtering medium.

Example 4

A further exemplifying embodiment relates to the production of particles and coverings based on zero-valent iron in a filtering medium carried out through two application cycles of the method according to the present invention. The filtering medium consists of a column packed with silica sand (Dorsilit n. 7, Dorfner, nominal average size dSs=0.87 mm) saturated with deionized water. The operating conditions are similar to those of Example 2, in which the flow of a fluid (F), consisting of deionized water, was forced inside the filtering medium at a flow rate of 0.5 ml/min and kept active during all the application steps of the method. From the same injection point 1 the solution of metal ions (SOL1) and the inorganic reducing agent (SOL2) were sequentially injected inside the filtering medium with an additional flow rate 8 equal to 1 ml/min. The solution of the metal salt was prepared using heptahydrate ferrous sulfate at a concentration of 40 mM, the solution of the reducing agent was prepared using sodium dithionite at a concentration double than that of iron, bringing the pH value to 12.5 with hydroxide of sodium.

The injection protocol provided two application cycles of the method between which an injection step of a third fluid (SOL3) having properties such that it interacts neither with the metal ions, nor with the inorganic reducing agent, nor with the filtering medium, specifically deionized water, was interposed. The detail of the applied steps follows:

Cycle 1
 a) preconditioning of the filtering medium with deionized water for about 30 minutes;
 b) injection of SOL2 for a time period of 15 minutes;
 c) injection of SOL1 for a time period of 15 minutes;
 d) injection of SOL3 for a time period of 10 minutes;

Cycle 2
 e) injection of SOL2 for a time period of 15 minutes;
 f) injection of SOL1 for a time period of 15 minutes;
 g) washing with deionized water for 10 minutes.

Similarly to Example 2, the whole filtering medium is affected by the formation of microparticles and nanoparticles and coverings of the medium itself. By controlling the duration of the injection times it is possible to involve a lower portion (or partial and not complete) of the filtering medium. In the case of applications at the field scale, the duration of each injection step is decided depending on specific considerations relating to the characteristics of the contaminated site, better if previously calibrated through experimental laboratory tests.

Figure 12:
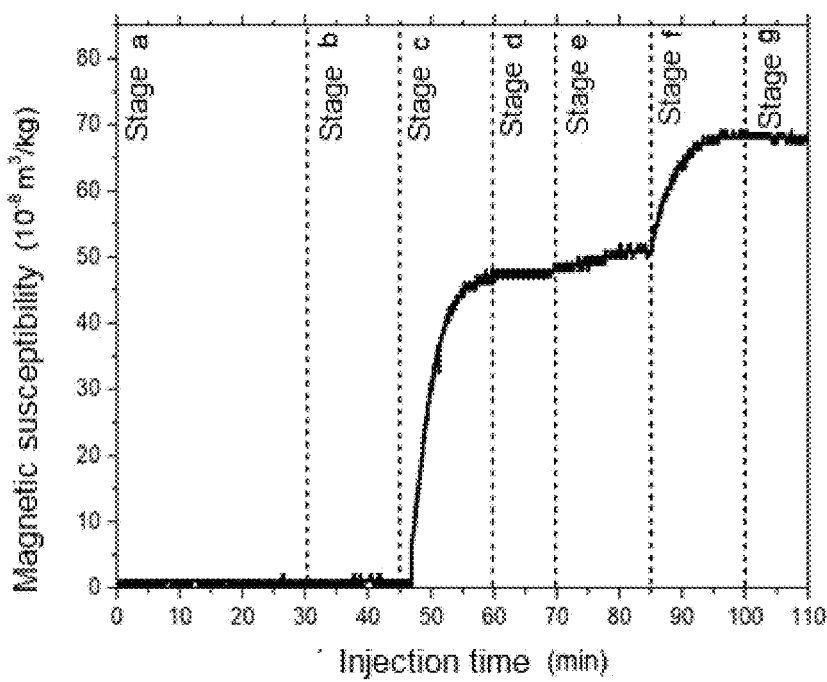
FIG. 12 illustrates the increase in magnetic susceptibility over time (proportional to the concentration of zero-valent iron) inside a filtering medium, which is an index of the formation of particles and coverings based on zero-valent metals by means of the application of two cycles of the method according to the present invention.

Result: FIG. 12 shows the evolution of magnetic susceptibility at the center of the column, directly proportional to the produced amount of zero-valent iron. The magnetic susceptibility monitored over time has recorded an increase similar to that reported in the previous example, reaching a value of about $45*10^{-8}$ m$^3$/kg. During the injection step "d" of SOL3 between the two injection cycles the magnetic susceptibility remains essentially unchanged while a slight increase during step "e" (second injection of SOL2) and an again marked increase in phase "f" (second injection of SOL1) reaching a final value of about $70*10^{-8}$ m$^3$/kg were recorded. The injection of water at step "g" does not alter magnetic susceptibility. Differently from Example 2, a part of the particles produced during the application of the method has been recovered upon exiting the filtering medium since transported inside the intergranular space of the filtering medium itself due to the flow rate of the bottom fluid F.

Example 5

A fifth exemplifying embodiment relates to the synthesis of zero-valent manganese particles in a filtering medium carried out through an injection cycle using sodium borohydride as inorganic reducing agent. The filtering medium consists of a packing of glass beads (Soda-Lime glass beads, Sigmund Linder, nominal average size $dS_G$=0.62 mm), the injection flow rate of the solutions and the bottom flow rate are kept equal to those of Examples 2 and 4. On the contrary, the order of injection of SOL1 and SOL2 is inverted with respect to Examples 2 and 4. The solution of the manganese salt was prepared using tetrahydrate manganese chloride at a concentration of 20 mM, the solution of the reducing agent was prepared using sodium borohydride at a concentration double than that of manganese, bringing the pH value to 9 with sodium hydroxide. The injection protocol provided:
 a) preconditioning the filtering medium with deionized water for about 30 minutes;
 b) injection of SOL1 for a time period of 15 minutes;
 c) injection of SOL2 for a time period of 15 minutes;
 d) washing with deionized water for 10 minutes.

Figure 13:
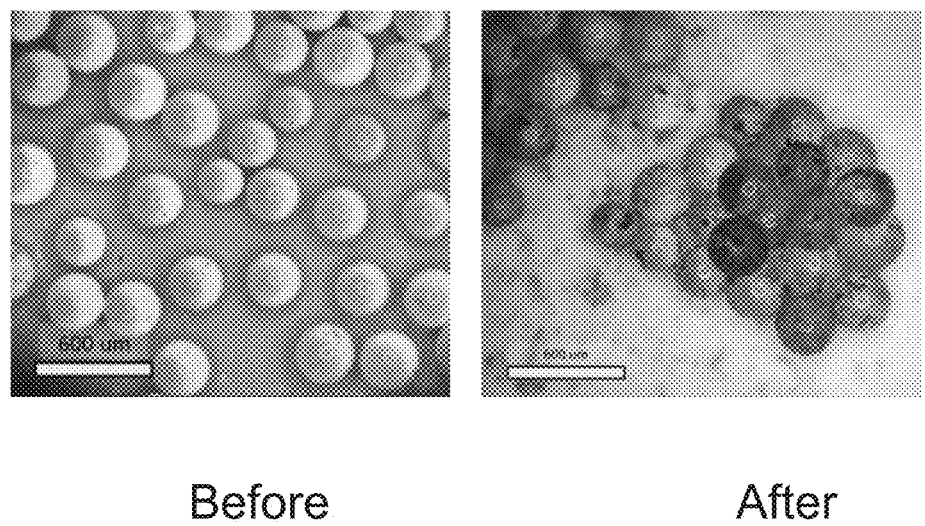
FIG. 13 shows optical microscopies of glass beads forming the filtering medium of Example 5 respectively before and after the application of the method for producing zero-valent metals in filtering media, in which the formation of the particles and of the coverings based on zero-valent metals inside the filtering medium is evident.

Result: the method has been successfully applied for the generation of particles and coverings based on zero-valent metal, with generation of hydrogen inside the filtering medium due to the reaction of sodium borohydride. With reference to FIG. 13, it is observed an analysis of microscopy performed on the glass beads forming the filtering medium before and after the application of the method. The figure shows how inside the filtering medium zero-valent manganese has been generated both in the form of particles adhered on the surface of the glass beads and as a more or less continuous superficial layer covering the surface of the beads themselves. Also in this case a part of the particles produced during the application of the method remained adhered to the surface of the glass beads, while a part has passed through the filtering medium up to the exit due to the flow rate of the bottom fluid F since it is still mobile inside the intergranular spaces.

Example 6

A further exemplifying embodiment relates to the formation of particles and coverings based on zero-valent iron in a filtering medium carried out in the presence of an electric field. The filtering medium is made of a packing of quartz sand and the flow operating conditions are the same of Example 2, in terms of the injection flow rate of the solutions and flow rate of the bottom fluid. The injected solutions are made of heptahydrate ferrous sulfate at a concentration of 40 mM (SOL1) and sodium dithionite (SOL2) at a concentration double than that of iron. The protocol referred to the same steps of Example 2:
 a) preconditioning of the filtering medium with deionized water for about 20 minutes;
 b) injection of SOL2 for a time period of 15 minutes;
 c) injection of SOL1 for a time period of 15 minutes;
 d) washing with deionized water for 20 minutes.

The electric field was applied through two graphite electrodes fixed at the two ends of the filtering medium and to which a constant current of 0.26 A was imposed in order to obtain a current density of 0.2 A/cm$^2$ in the filtering medium. The electric field was applied during steps "b" and "c". The polarity of the electrodes was inverted every 10 minutes.

Figure 14:
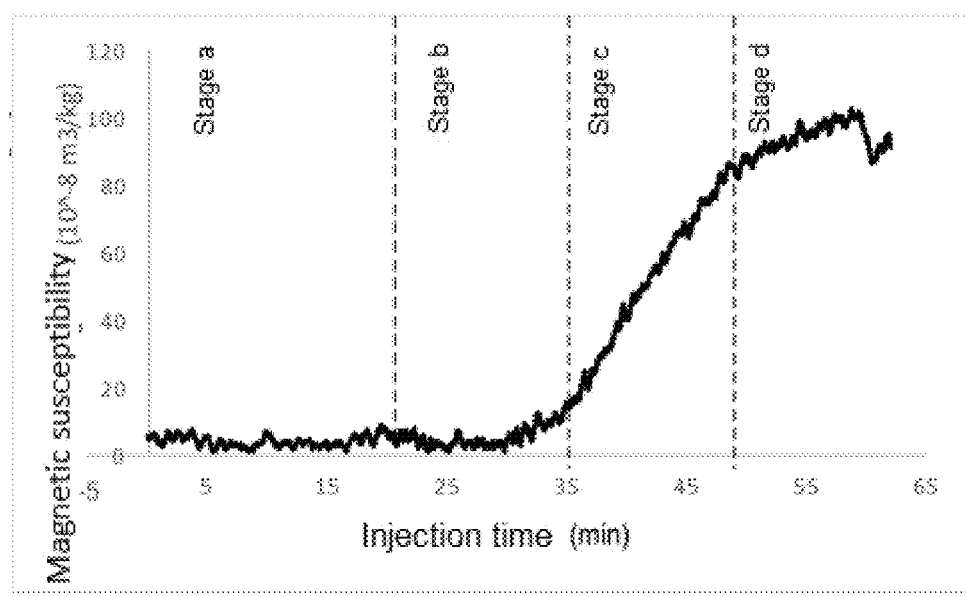
FIG. 14 shows the increase in magnetic susceptibility over time (proportional to the concentration of zero-valent iron) inside a filtering; medium, which is an index of the formation of particles and coverings based on zero-valent metals by means of the application of the method according to the present invention in the presence of an electric field during the injection steps of SOL1 and SOL2.

Result: FIG. 14 shows the evolution of magnetic susceptibility at the center of the column, directly proportional to the produced amount of zero-valent iron. The result obtained is similar to that Observed for Example 1, with a significant increase in magnetic susceptibility during step "c". In this case, however, the observed maximum value of magnetic susceptibility, equal to about $100*10^{-8}$ m$^3$ kg, is greater than that of the method applied in the absence of an electric field. This increase is due to the presence of the electric field that creates favorable conditions for the reduction of ferrous ions and the consequent formation of zero-valent iron. This result confirms that the application of an electric field can be used to favor the production of particles and coverings based on zero-valent metals in filtering media.

Example 7

A further exemplifying embodiment relates to the formation of nanoparticle of zero-valent iron in a defined portion of the column through a predefined sequential injection of the reagents. The filtering medium is made of a packing of quartz sand and the flow operating conditions are the same of Example 2, in terms of injection flow rate of the solutions and flow rate of the bottom fluid. The solution of metal salt was prepared using ferric chloride (SOL1) at a concentration of 40 mM, while the solution of the reducing agent was prepared using sodium borohydride (SOL2) at a concentration double than that of iron, bringing the pH value to 10 with sodium hydroxide. Deionized water was used as a third fluid (SOL3) having properties such that it interacts neither with the metal ions, nor with the inorganic reducing agent, nor with the filtering medium, to control the formation point of the zero-valent metals inside the filtering medium.

The injection protocol provided:
a) preconditioning of the filtering medium with deionized water for about 30 minutes;
b) injection of SOL2 for a time period of 15 minutes;
c) injection of the third fluid SOL3 for 3.5 minutes so as to determine the area of the column affected by the formation of the particles;
d) injection of SOL1 for a time period of 15 minutes;
e) washing with deionized water for 20 minutes.

Figure 15:
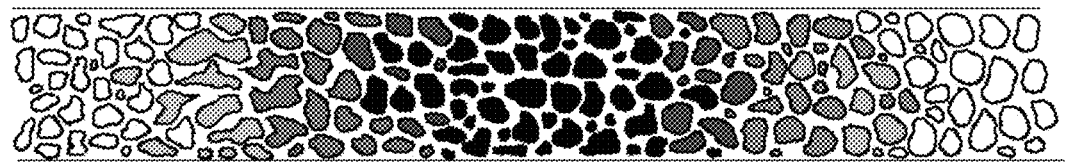
FIG. 15 shows the picture of the filtering medium of Example 7 consisting of quartz sand after the application of the method according to the present invention, in which the formation of zero-valent metals in the central portion of the filtering medium is evident.

Result: with reference to FIG. 15 it is observed that the application of the method according to the present invention through the injection of SOL3 between the injection steps of SOL1 and SOL2 has led to the formation of the particles and of the coverings based on zero-valent iron in a restricted portion of the filtering medium, specifically in the center of the quartz column. On the contrary, the ends of the column lack zero-valent metals. This example demonstrates that the injection of SOL3 allows to control the mixing of SOL1 and SOL2 inside the filtering medium to determine the portion of filtering medium in which to induce the formation of zero-valent metals. By controlling the duration of the injection steps of SOL1, SOL2 and SOL3 and the injection flow rates of the fluids it is possible to control the position inside the filtering medium in which to form the particles and the coverings based on zero-valent metals. Furthermore, the formation of the particles and of the coverings based on zero-valent iron induced a modification of the thermal properties of the filtering medium, in particular producing an increase in the thermal conductivity of the central portion of the filtering medium itself in which the iron particles and coverings were formed.

Example 8

A final exemplifying embodiment relates to the formation of bimetal microparticles and nanoparticles made of a noble metal and of a transition metal in a bidimensional 2D filtering medium. The filtering medium consists of a bidimensional 2D packing of glass beads (Soda-lime glass, Sigmund Linder, nominal average size $dS_G$=0.62 mm) having dimensions of 30×13×1.2 cm (length×width×thickness). Inside the filtering medium a bottom fluid is present, which is in continuous flow from left to right at a Darcy velocity of 0.35 cm/min. SOL1 consists of a mixture of heptahydrate ferrous sulfate at 30 mM and of silver nitrate at 10 mM, while SOL2 consists of sodium dithionite at a concentration of 100 mM, bringing the pH value to 12.5 with sodium hydroxide.

Moreover, the filtering medium was arranged with an injection well at the center of the domain for the introduction of SOL1 at a flow rate of 1.5 mL/min. SOL2 is instead injected from the left side of the filtering medium at a flow rate of 1.5 ml/min. SOL1 and SOL2 were injected simultaneously, for 35 min from two different introduction points with never interrupting the flow rate of the bottom fluid.

Figure 16:
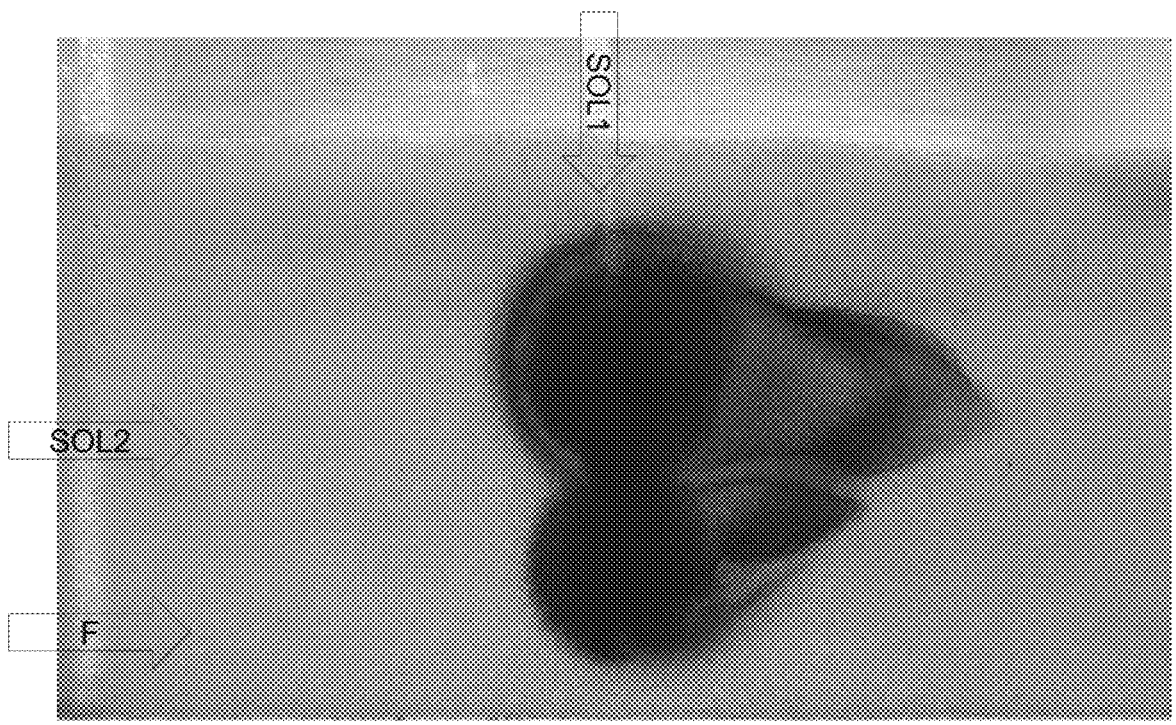
FIG. 16 shows the picture of the bi-dimensional 2D filtering medium of Example 8 consisting of glass beads after the application of the method according to the present invention, in which particles and bimetal coverings have been created in the central portion of the filtering medium following the injection of SOL1 and SOL2 from two different introduction points.
Figure 17:
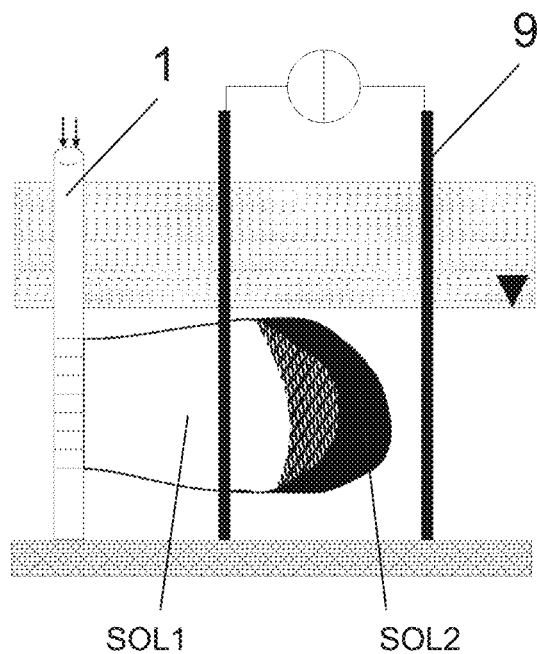
FIG. 17 represents a schematic table describing a possible way of application in contaminated aquifers of the method according to the present invention that provides the sequential injection from the same introduction point (1) of a solution of at least one metal and of an inorganic reducing agent and the application, where deemed to be preferred and/or necessary, of an electric field (9) to favor the production of zero-valent metals in filtering media.

Result: FIG. 16 shows a picture of the filtering medium at the end of the application of the method for forming the zero-valent metals in filtering media according to the present invention. From the figure the formation of particles and coverings based on zero-valent metals in the center of the filtering medium, around the introduction point of the SOL1, is evident. SOL2 introduced from the left side of the domain passes through the filtering medium due to the flow rate of the bottom fluid and reaches the center of the filtering medium itself where it mixes with SOL1 introduced from the specially arranged injection point. The mixing of SOL1 and SOL2 in the central portion of the filtering medium induces the reduction of the metal ions to the zero-valent state and the formation of particles and coverings directly inside the filtering medium. Furthermore, the simultaneous presence of noble metals favors the reduction reaction to the zero-valent state of the transition metal or lanthanide or actinide, leading to the formation of multimetal particles.

From the description given above it is evident, therefore, how the methods, the metal microparticles and nanoparticles and the filtering media covered with reactive material according to the present invention allow to reach the proposed purposes.

It is equally evident, to a person skilled in the art, that it is possible to make modifications and further variations to the solution described with reference to the attached figures, without falling out the teaching of the present invention and departing from the scope as defined in the appended claims.

What is claimed is:

1. A method for modifying mechanical, electrical, chemical, chemical-physical, microbiological, hydrodynamic, geochemical, geotechnical, and/or superficial properties of an in-flow filtering medium and/or of a fluid contained in the filtering medium, comprising a production, inside the filtering medium, of microparticles, nanoparticles, and/or coverings of the filtering medium containing at least one zero-valent metal by means of an introduction of a first aqueous solution of at least one metal inside the filtering medium and an introduction of a second aqueous solution of at least one inorganic reducing agent inside the filtering medium, wherein introducing the first aqueous solution and introducing the second aqueous solution is without interrupting fluid flow through the filtering medium.

2. A method for producing microparticles, nanoparticles, and/or coverings containing at least one zero-valent metal inside an in-flow filtering medium, comprising the following steps:
step 100) providing a first aqueous solution of at least one metal or a salt of the at least one metal;
step 101) providing a second aqueous solution of at least one inorganic reducing agent;
step 102) preparing the filtering medium for introducing the first aqueous solution of the step 100 and the second aqueous solution of the step 101;
step 103a) introducing the first aqueous solution inside the filtering medium;

step 103b) introducing the second aqueous solution inside the filtering medium;

step 103) amounts of the first aqueous solution of the step 103a and the second aqueous solution of the step 103b are in a predetermined mutual ratio, wherein introducing the first aqueous solution and introducing the second aqueous solution is without interrupting fluid flow through the filtering medium;

step 104) allowing or inducing a mixing of the first aqueous solution with the second aqueous solution inside the filtering medium in order to produce the microparticles, the nanoparticles, and/or the coverings containing the at least one zero-valent metal (D) directly inside the filtering medium, thus modifying mechanical, electrical, chemical, chemical-physical, microbiological, hydrodynamic, geochemical, geotechnical, thermal, morphological, and/or superficial properties of the filtering medium.

3. The method according to claim 2, wherein the filtering medium is selected from a porous media; a low-permeability porous media; silts; clays; a granular media; a fractured media; porous or filtering systems; structured packings and packed systems; systems of pores, channels, and/or mutual interconnected chambers, sponges, nets and lattice systems; honeycomb-like elements; filters; fabrics; foams and foam materials; biological filters; and systems allowing a filtration, an infiltration, a permeation and/or a transport of fluids internally thereof.

4. The method according to claim 2, wherein the microparticles, the nanoparticles, and/or the coverings produced in the filtering medium comprising a content of the at least one metal at a zero-valent state equal to at least 0.5% by weight.

5. The method according to claim 2, wherein the at least one metal or the salt of the at least one metal is selected from noble metals, transition metals, lanthanides, actinides or a mixture of the actinides.

6. The method according to claim 5, wherein the at least one metal or the salt of the at least one metal is selected from silver, gold, platinum, palladium, copper, iron, manganese, zinc, nickel, indium, or a mixture thereof.

7. The method according to claim 2, wherein a concentration of the at least one metal or the salt of the at least one metal is between 0.001 mM and 1 M.

8. The method according to claim 7, wherein the concentration of the at least one metal or the salt of the at least one metal is between 1 mM and 1 M.

9. The method according to claim 2, wherein the second solution has a pH value between 3 and 14.

10. The method according to claim 9, wherein the second solution has a pH value between 8 and 12.

11. The method according to claim 2, wherein the microparticles, the nanoparticles, and/or the coverings containing the at least one zero-valent metal produced in the filtering medium have at least one of the following characteristics:
the microparticles, the nanoparticles, and/or the coverings containing the at least one zero-valent metal produced in the filtering medium are multi-metal;
the microparticles, the nanoparticles, and/or the coverings containing the at least one zero-valent metal produced in the filtering medium contain oxides of noble metals, transition metals, lanthanides, and/or actinides; and
the microparticles, the nanoparticles, and/or the coverings containing the at least one zero-valent metal produced in the filtering medium are embedded in a crystalline or an amorphous matrix of sulfides, sulfites, sulfates, or borates of noble metals, transition metals, lanthanides, and/or actinides.

12. The method according to claim 2, wherein the first aqueous solution of the at least one metal or the salt of the at least one metal and the second aqueous solution of the at least one inorganic reducing agent are mixed before or during being introduced inside the filtering medium according to steps 103a and 103b.

13. The method according to claim 2, wherein:
the step 103 further comprises a substep 103c wherein a third aqueous solution of: the at least one metal or the salt of the at least one metal, with a concentration of the at least one metal or the salt of the at least one metal in the third aqueous solution different from a concentration in the first aqueous solution; or of the at least one inorganic reducing agent, with a concentration of the at least one inorganic reducing agent in the third aqueous solution different from a concentration in the second aqueous solution, is introduced inside the filtering medium between the steps 103a and 103b to control a portion of the filtering medium, wherein the microparticles, the nanoparticles and/or the coverings containing the zero-valent metals are produced in the filtering medium.

14. The method according to claim 13, wherein the first aqueous solution, the second aqueous solution, and/or the third aqueous solution, contain one or more stabilizing agents and/or thickeners, wherein the thickeners are organic, inorganic polymers, surfactants, and/or polyelectrolytes.

15. The method according to claim 13, wherein introduction modes, amounts of the first aqueous solution, amounts of the second aqueous solution, amounts of the third aqueous solution, concentrations of the at least one metal or the salt of the at least one metal, concentrations of the at least one inorganic reducing agent, flow rates applied, a duration of individual steps, and an order of individual steps are predetermined to control a portion of the filtering medium, wherein the microparticles, the nanoparticles, and/or the coverings containing the zero-valent metals are produced.

16. The method according to claim 13, wherein the step 103 and substeps 103a, 103b and 103c are cyclically repeated.

17. The method according to claim 16, wherein, between one cycle and a next cycle, the third aqueous solution is introduced inside the filtering medium.

18. The method according to claim 16, wherein the step 103 and substeps 103a, 103b and 103c are cyclically repeated alternating in each cycle a use of a noble metal, a transition metal, or a metal belonging to a group of lanthanides or actinides.

19. The method according to claim 13, wherein the step 103 and substeps 103a, 103b and 103c are cyclically repeated with different operating modes, by varying an order of the substeps, using different metals and/or reducing agents, using different physical points, and/or using different times of introduction.

20. The method according to claim 13, wherein the introduction, inside the filtering medium, of the at least one metal or the salt of the at least one metal, the introduction, inside the filtering medium, of the at least one inorganic reducing agent, and the introduction, inside the filtering medium, of the third aqueous solution, takes place according to one of the following modes:
sequentially, with introduction steps occurring at different times, from a same introduction point or from different introduction points;

at the same time, at different points in space; and at the same introduction point, but at different levels or depths.

21. The method according to claim 13, wherein the filtering medium (C) is a soil and/or a subsoil, and an unsaturated medium, a vadose zone, a capillary fringe, phreatic aquifer systems, artesian aquifer systems, or a combination of artesian and phreatic aquifer systems; or a portion of soil and/or the subsoil extracted and prepared on purpose for an introduction of the at least one metal or the salt of the at least one metal, the at least one reducing agent, and the third aqueous solution.

22. The method according to claim 2, wherein a concentration of at least one metal in the first aqueous solution is lower than 0.1 mM.

23. The method according to claim 2, wherein the mixing between the at least one metal or the salt of the at least one metal and the at least one inorganic reducing agent takes place directly inside the filtering medium through at least one of the following mechanisms:
a velocity difference in the filtering medium; delayed transport of the at least one metal or the delayed transport of the at least one reducing agent; a viscous fingering; a chaotic convection; a density difference; a hydrodynamic dispersion; temperature, viscosity, density, and/or phase contrasts; an electrophoresis; an electrokinetics; an electrosmosis; a generation of electric, magnetic, or electromagnetic fields; different solubility of the at least one metal or different solubility of the at least one reducing agent; application of ultrasounds, an alternate pumping, and/or a suction and a re-injection; a local inversion of a flow direction; exploitation of natural or induced heterogeneities of a hydraulic conductivity of the filtering medium; exploitation of other hydrodynamic properties of the filtering medium; and/or exploitation of a saturation of the filtering medium.

24. The method according to claim 2, wherein the at least one metal or the salt of the at least one metal, the at least one reducing agent and a third aqueous solution, are introduced inside the filtering medium through at least one of the following introduction techniques:
injection through individual wells;
injection through multilevel wells;
a direct push;
a jetting;
mixing with a subsoil;
trenches;
dosing at a campaign level;
application of a positive pressure, by a suction or by an effect of gravity only;
fracturing of the filtering medium or a permeation; and
in any other mode suitable to deliver materials in a subsoil or by a combined use of introduction techniques.

25. A method for producing microparticles, nanoparticles, and/or coverings containing at least one zero-valent metal inside an in-flow filtering medium, comprising the following steps:
step 201) providing an aqueous solution of at least one inorganic reducing agent;
step 202) providing the filtering medium containing at least one metal or a salt of the at least one metal, as a dissolved phase, as a solid phase, and/or in a fluid inside the filtering medium having a non-zero concentration of the at least one metal present as the dissolved phase and/or the solid phase;
step 203) introducing the aqueous solution inside the filtering medium, wherein introducing the aqueous solution is without interrupting fluid flow through the filtering medium;
step 204) allowing or inducing a mixing, inside the filtering medium, of the aqueous solution with the at least one metal present in the filtering medium or in the fluid contained in the filtering medium, in order to produce the microparticles, the nanoparticles, and/or the coverings containing the at least one zero-valent metal directly inside the filtering medium, thus modifying mechanical, electrical, chemical, chemical-physical, microbiological, hydrodynamic properties, geochemical, geotechnical, thermal, morphological, and/or superficial properties of the filtering medium.

26. The method according to claim 25, wherein:
the fluid flow through the filtering medium is a bottom flow, the fluid is flowing through the filtering medium in a natural flow or a forced flow, continuous or variable in time; and
generation of the microparticles, the nanoparticles, and/or the coverings containing the at least one zero-valent metal further modifies the mechanical, rheological, the chemical, the chemical-physical, toxicological, organoleptic, the microbiological, and/or the geochemical properties of the fluid flowing through the filtering medium.

27. The method according to claim 25, wherein at least one step is carried out in a presence of an electric field applied to the filtering medium and/or to the fluid contained inside the filtering medium.

28. The method according to claim 27, wherein:
the electric field is applied to the filtering medium and/or to the fluid contained inside the filtering medium by at least two electrodes wherein the at least two electrodes are introduced inside the filtering medium, are installed in correspondence and/or to coincide with physical points of introduction of reagents, or are produced directly inside the filtering medium by a localized introduction of conductive materials;
the electric field is applied imposing a current or a potential to the at least two electrodes in order to guarantee a current density inside the filtering medium in a range 0.0001 A/cm$^2$ and 1,000 A/cm$^2$ and an electric potential gradient in a range 0.0001 V/m and 1,000 V/m.

29. The method according to claim 28, wherein an electric polarity at the at least two electrodes is inverted in time and/or in space.

30. The method according to claim 25, wherein the fluid consists of several mutual miscible or non-miscible phases, a solution, a liquid or solid aerosol, a foam, an emulsion, a sol, or a mixture of the sol.

31. The method according to claim 25, wherein the step 203 is cyclically repeated.

32. The method according to claim 25, wherein the filtering medium contains the at least one metal or the salt of the at least one metal, as the dissolved phase, as the solid phase, and/or in the fluid inside the filtering medium, static or in flow, having the non-zero concentration of the at least one metal in the dissolved phase and/or the solid phase.

33. The method according to claim 25, wherein the filtering medium and/or the fluid contained in the filtering medium are contaminated or potentially contaminated.

34. A method for a remediation, a treatment of an in-flow filtering medium, wherein the filtering medium is a contaminated filtering medium, and/or a treatment of a contaminated fluid present inside the filtering medium, comprising the steps of:
- step 300) providing a first aqueous solution of at least one metal or a salt of the at least one metal;
- step 301) providing a second aqueous solution of at least one inorganic reducing agent;
- step 302) preparing the contaminated filtering medium for an introduction of the first aqueous solution of the step 300 and the second aqueous solution of the step 301;
- step 303a) introducing the first aqueous solution into the contaminated filtering medium;
- step 303b) introducing the second aqueous solution into the contaminated filtering medium;
- wherein amounts of the first aqueous solution of the step 303a and the second aqueous solution of the step 303b are in a predetermined mutual ratio, wherein introducing the first aqueous solution and introducing the second aqueous solution is without interrupting fluid flow through the filtering medium;
- step 304) allowing or inducing a mixing of the first aqueous solution and the second aqueous solution, inside the contaminated filtering medium, in order to produce microparticles, nanoparticles, and/or coverings containing at least one zero-valent metal directly inside or on the surface of the contaminated filtering medium;
- step 305) allowing or inducing a contact between contaminants and the microparticles, the nanoparticles, and/or the coverings containing the at least one zero-valent metal to induce a degradation, a transformation, and/or an immobilization of the contaminants.

35. The method according to claim 34, wherein the microparticles and/or the nanoparticles produced in the filtering medium partly adhere to the surface of the filtering medium and are partly free to migrate through the filtering medium and/or inside the fluid.

36. The method according to claim 34, wherein the at least one inorganic reducing agent is selected from borohydrides, diboranes, sulfates, sulfites, bisulfites, metabisulfites, dithionites, dithionates, thiosulfates, iodides, stannous chloride, or of a mixture thereof.

37. The method according to claim 36, wherein a mass of the at least one inorganic reducing agent in the aqueous solution is greater than 0.001 times a stoichiometric amount necessary for a reduction reaction to the zero-valent form of the at least one metal or the salt of the at least one metal.

38. The method according to claim 37, wherein the mass of the at least one inorganic reducing agent in the aqueous solution is between 0.1 and 50 times the stoichiometric amount necessary for the reduction reaction to the zero-valent form of the at least one metal or the salt of the at least one metal.

* * * * *